US008255548B2

(12) United States Patent
Hopkins et al.

(10) Patent No.: US 8,255,548 B2
(45) Date of Patent: Aug. 28, 2012

(54) OFFLINE WEB SERVICES API TO MIRROR ONLINE WEB SERVICES API

(75) Inventors: Chris Hopkins, San Mateo, CA (US); Benji Jasik, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1282 days.

(21) Appl. No.: 11/537,388

(22) Filed: Sep. 29, 2006

(65) Prior Publication Data

US 2007/0078950 A1    Apr. 5, 2007

Related U.S. Application Data

(63) Continuation-in-part of application No. 10/287,177, filed on Nov. 4, 2002.

(60) Provisional application No. 60/388,832, filed on Jun. 13, 2002.

(51) Int. Cl.
*G06F 15/16* (2006.01)
*G06F 15/173* (2006.01)

(52) U.S. Cl. ........................................ 709/229; 709/239

(58) Field of Classification Search .................... 709/229
See application file for complete search history.

(56) References Cited

U.S. PATENT DOCUMENTS

| 6,594,682 | B2 | 7/2003 | Peterson et al. |
| 6,954,782 | B2 | 10/2005 | Thurlow et al. |
| 2002/0013827 | A1* | 1/2002 | Edstrom et al. ............... 709/219 |
| 2002/0083145 | A1 | 6/2002 | Perinpanathan |
| 2002/0198951 | A1 | 12/2002 | Thurlow et al. |
| 2003/0158947 | A1* | 8/2003 | Bloch et al. ................... 709/227 |
| 2005/0164684 | A1 | 7/2005 | Chen et al. |

OTHER PUBLICATIONS

Bray, Tim et al. "Extensible Markup Language (XML) 1,0" W3C Recommendation, http://www.w3.org/TR/2000/REC-xml-20001006; Oct. 6, 2000, printed on Jun. 13, 2002.
Clark, James, "XSL Transformations (XSLT) Version 1.0" W3C Recommendation. http://www.w3.org/TR/1999/REC-xsit-19991116, Nov. 16, 1999, printed on Jun. 13, 2002.
Winer, Dave, "XML-RPC Specification," at XML-RPC.com: posted Jun. 15, 1999, printed on Jun. 13, 2002.

* cited by examiner

*Primary Examiner* — Thu Nguyen
*Assistant Examiner* — Joseph Greene
(74) *Attorney, Agent, or Firm* — Novak Druce + Quigg

(57) ABSTRACT

Methods and systems for simulating an online session between the client and a remote server when the client is offline including simulating a web services API to access information when the client is offline. The client includes a local interface that can communicate with the remote server. During an online session, the data and the functional logic that is invoked to manipulate the data reside on the remote server. As such, the user transmits instructions to view, create, update, delete, or otherwise modify portions of data through the local interface and subsequently through the underlying network. These instructions are ultimately received at the remote server, which then invokes the proper functional logic to perform the instructions in order to manipulate the data. An API is provided that is substantially identical to the web services API that is typically accessed over the internet, but which simulates online functionality when offline. The client program talks to a single API, and in certain aspects that API determines whether to direct requests to a local database (which can later be synchronized with the online system) if the client is offline, or directly against the online system (e.g., if the client is connected via the Internet).

36 Claims, 31 Drawing Sheets

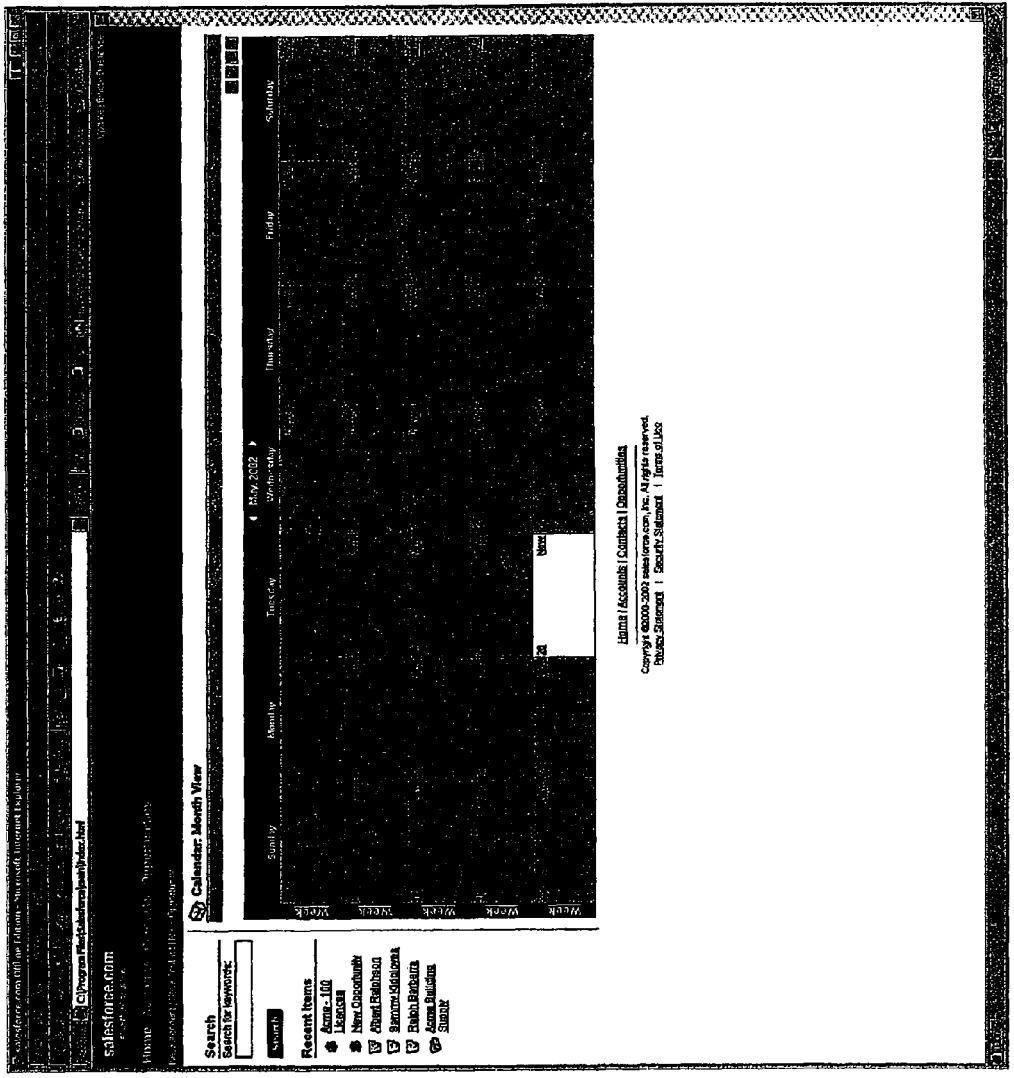
FIGURE]JC

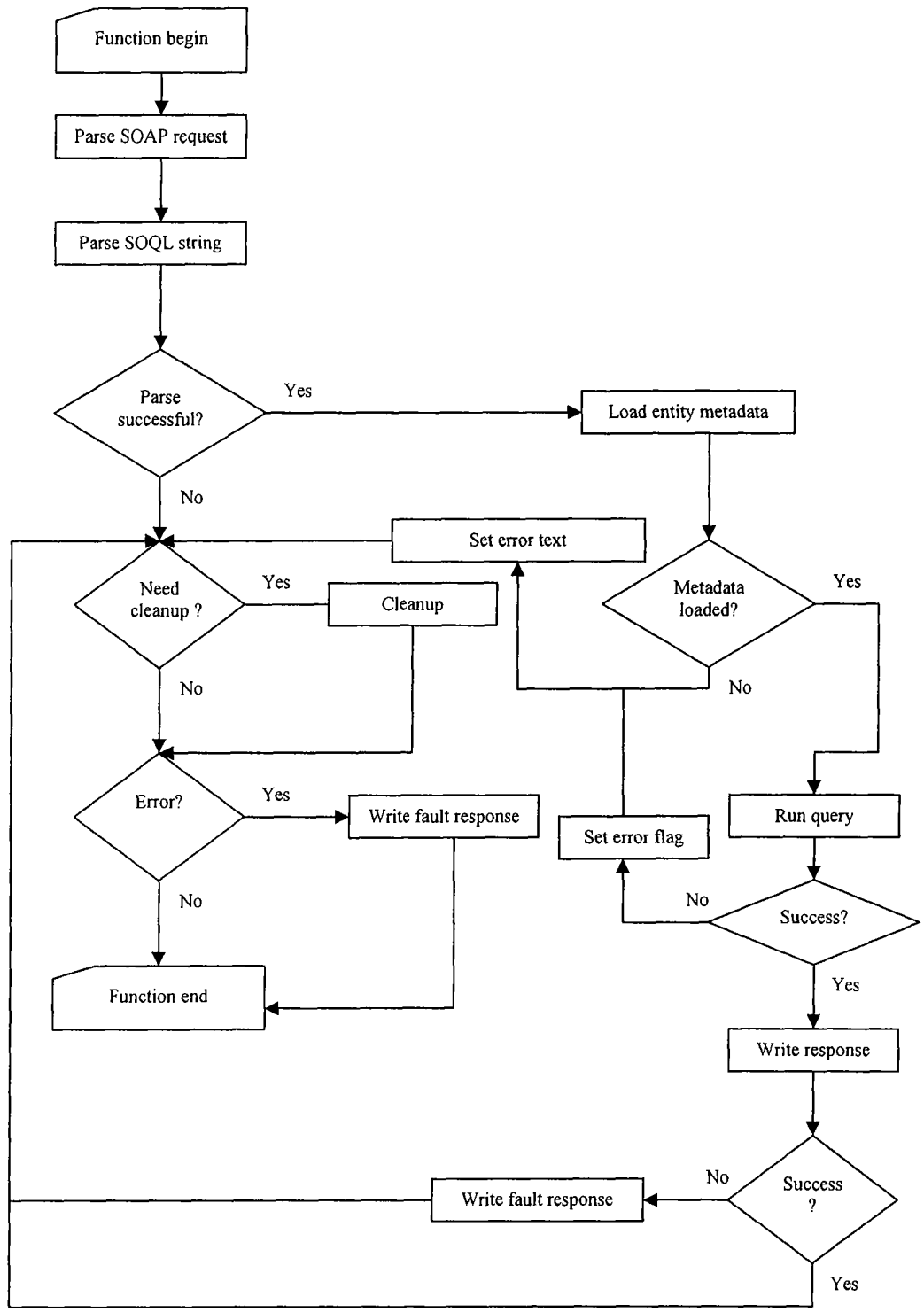
Figure 16: CQueryHandler::HandleRequest process flow:

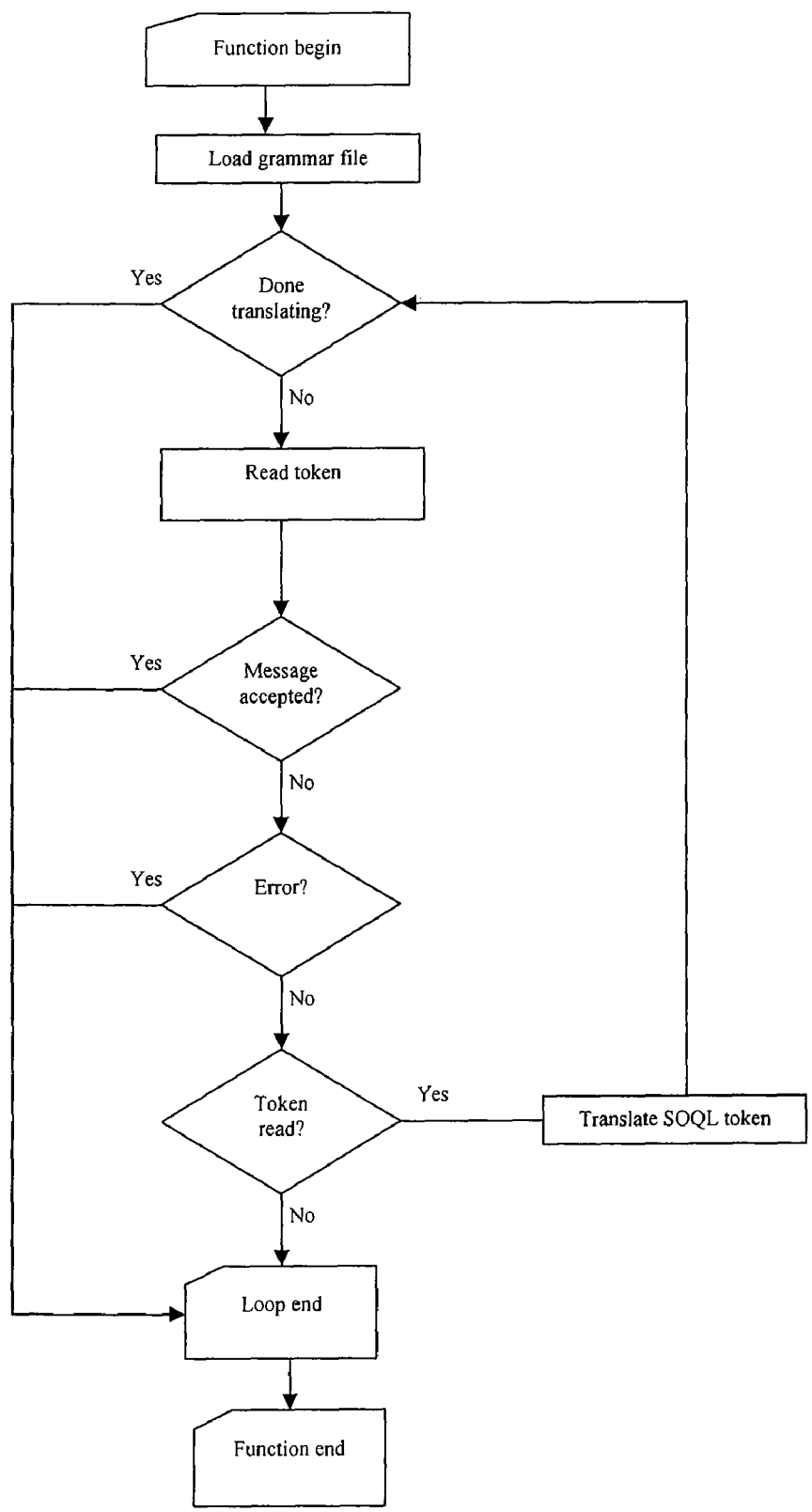
Figure 17: CQueryHandler::ParseSOQLString process flow

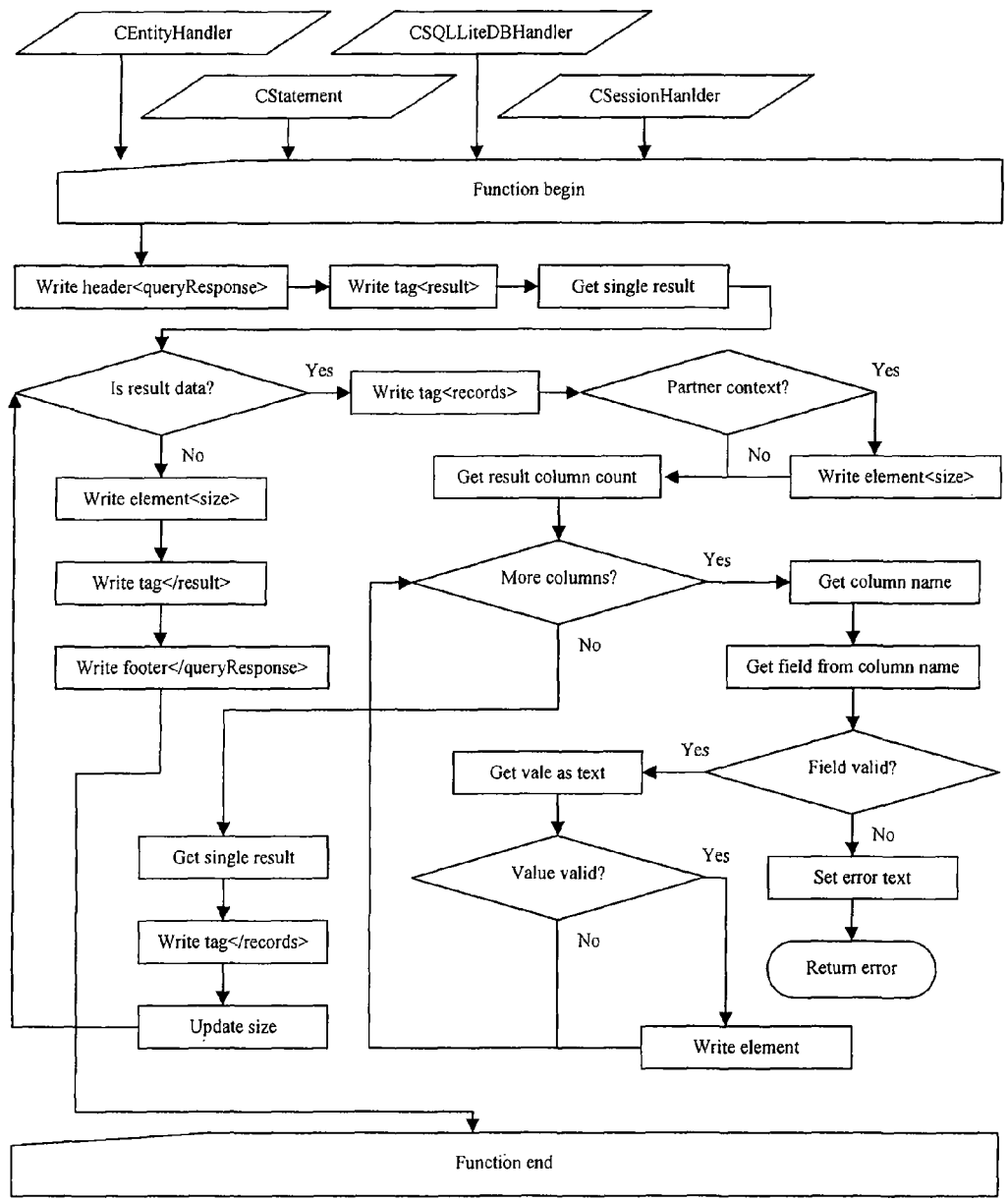
Figure 18: SOAP40ResponseWrite::WriteQueryResponse process flow ( All of the above methods will return error codes identical to the online API if an invalid message is passed, or incorrect types are passed.)

OFFLINE WEB SERVICES API TO MIRROR ONLINE WEB SERVICES API

CROSS-REFERENCES TO RELATED APPLICATIONS

This application is a continuation-in-part application of U.S. patent application Ser. No. 10/287,177, which claims the benefit of U.S. provisional patent application No. 60/388,832 filed on Jun. 13, 2002, both of which are hereby incorporated by reference.

FIELD OF THE INVENTION

The present invention relates to a computer method and system for simulating an online session while offline, and more particularly, to such a method and system in the field of customer relationship management.

BACKGROUND

The Internet provides the capability to provide services to customers without requiring them to install additional software on their local computers. Specifically, by exploiting the customer's web browser, all functional logic and all data can reside at a remote server rather than at the customer's local computer (i.e., the client). As such, the customer, via instructions submitted through web pages that are displayed in the web browser, can remotely invoke the functional logic to view, create, update, delete or otherwise modify the data residing on the remote server.

In the field of customer relationship management ("CRM"), for example, the foregoing use of the Internet is ideal for enabling sales, customer support, and marketing teams and individuals to organize and manage their customer information. For example, all leads, opportunities, contacts, accounts, forecasts, cases, and solutions can be stored at a secure data center but may be easily viewed by any authorized sales-person (e.g., with a proper username and password) through a web browser and Internet connection. One key benefit of such an online CRM solution is the ability to share data real-time and enable all team members to leverage a common set of information from one accessible location. For example, sales managers can track forecast roll-ups without requiring each sales representative to submit individual reports, as well as instantly access aggregated sales data without requiring each sales representative to manually submit such data. Similarly, reseller sales representatives and other external partners can be granted secure access to a company's sales data by providing them a username and password for the web site.

Nevertheless, such an online CRM solution suffers from the requirement that a user must have access to an Internet connection in order to access and manipulate the data residing on the remote server. For example, when a sales representative or manager is working in the field, such an Internet connection may not be readily available.

Accordingly it is desirable to provide systems and methods for simulating an online session while the user is offline (e.g., without a network connection). Furthermore, it would be advantageous if such systems and methods minimized the amount of user training and client-side installation and customization by taking advantage of pre-existing interfaces and technologies on the client computer. Moreover, it would be beneficial if information stored offline was available through one or more application program interfaces (APIs).

BRIEF SUMMARY

Various embodiments provide methods and systems for simulating an online session between the client and a remote server when the client is offline. The client includes a local interface that can communicate with the remote server. During an online session, the data and the functional logic that is invoked to manipulate the data reside on the remote server. As such, the user transmits instructions to view, create, update, delete, or otherwise modify portions of data through the local interface and subsequently through the underlying network. These instructions are ultimately received at the remote server, which then invokes the proper functional logic to perform the instructions in order to manipulate the data.

In preparation for simulating an online session when the client is offline, when the client is online, it imports at least a subset of the data that resides at the remote server. Furthermore, the client imports at least a subset of the functional logic used to manipulate the data as an embedded portion of a format or document that is capable of being interpreted and performed by the local interface. To initiate an offline session, the user invokes the local interface (as in the online session). However, rather than accessing the remote server, the local interface accesses local documents formatted with the embedded functional logic. As in the online session, the user transmits instructions to view, create, update, delete, or otherwise modify portions of data through the local interface. However, rather than transmitting the instructions through an underlying network, the local interface invokes the embedded functional logic in the documents to manipulate the imported data in response to the instructions.

As such, embodiments provide an offline simulation of an online session between the client and a remote server. Because the same local interface that is used in the online session is also used in the offline session, user training for the offline session is minimized or even eliminated. Furthermore, since functional logic is embedded into a format capable of being interpreted and executed by the local interface, the need to install additional standalone software applications is also minimized or eliminated.

Various embodiments also provide methods and systems for simulating a web services API to access information when the client is offline. This is done by implementing an API that is substantially identical to the web services API that is typically accessed over the internet, but which simulates online functionality when offline. The client program talks to a single API, and in certain aspects, that API determines whether to direct requests to a local database (which can later be synchronized with the online system) if the client is offline, or directly against the online system (e.g., if the client is connected via the Internet).

One example of how aspects of the present invention could be used is that a Windows program or application can be written to use web services APIs to read data into a client application (e.g., Excel). This data can be manipulated in the client application, and then updated back to the central database by making API update calls through the web services API. Once the client is disconnected, aspects of the present invention allow the client to make the same web services calls against an api endpoint on the local client. The local api endpoint, or another program module, would then update a database that resides on the local system. Necessary updates to the system are taken care of once the client connects online again during the synchronization process.

One benefit of the various embodiments is that a programmer using such offline APIs only needs to write one program or application against the web services APIs. Such a program can thus work online or offline without any modifications to the program.

According to one aspect of the present invention, a method is provided for simulating, at a client device, an API for an online session between a remote server and the client when the client is offline, wherein the remote server includes data and functional logic that manipulates the data in response to API calls received from the client device. The method typically includes downloading at least a portion of the data to a local database, and at least a subset of the functional logic, including one or more APIs, when an active network connection between the client device and the remote server is established (online session), and executing at the client, a portion of the downloaded functional logic to generate a message including an API call to access or manipulate data at the remote server. The method also typically includes sending the message to the remote server if the client is actively connected with the remote server over the network, and if not, receiving the message at a listener module resident on the client device, and processing the message locally by accessing the data identified by the API call in the local database and responding to the API call by the listener module.

According to another aspect of the present invention, a computer readable medium is provided that contains code executable by a processor in a client device to simulate an API for an online session between a remote server and the client when the client is offline, wherein the remote server includes data and functional logic that manipulates the data in response to API calls received from the client device. The code typically includes instructions to download at least a portion of the data from the remote server to a local database, and at least a subset of the functional logic, including one or more APIs, when an active network connection between the client device and the remote server is established (online session), and instructions to execute at the client, a portion of the downloaded functional logic to generate a message including an API call to access or manipulate data at the remote server. The code also typically includes instructions to send the message to the remote server if the client is actively connected with the remote server over the network, and if not, to process the message locally by accessing the data identified by the API call in the local database and responding to the API call.

According to yet another aspect of the present invention, a computer system is provided that typically includes a remote server that stores data and functional logic that manipulates the data in response to API calls received from one or more client devices, a network interconnect, and one or more client devices, each client device having a processor and a local database. The processor in a client typically executes logic that is operable to download at least a portion of the data from the remote server to a local database, and at least a subset of the functional logic, including one or more APIs, when an active network connection between the client device and the remote server is established (online session) over the network interconnect, and execute a portion of the downloaded functional logic to generate a message including an API call to access or manipulate data at the remote server. The processor in a client device is also typically configured to send the message to the remote server if the client is actively connected with the remote server over the network, and if not, to process the message locally by accessing the data identified by the API call in the local database and responding to the API call.

According to yet another aspect of the present invention, a method is provided for simulating an online session with a server at an off line client. The method typically includes downloading at least a portion of data stored at the server and at least a subset of functional logic of the server, including at least one API, to a database local to the client when an active network connection exists between the client and the server. The method also typically includes receiving a request to access data at the server using an API invocation, and sending a message to the server to access data responsive to the request when the client is actively connected with the remote server, and processing the message locally at the client by accessing data identified by the API invocation in the local database when the client is not actively connected with the server. In certain aspects, a computer readable medium stores code for implementing aspects of the method, which code is executable by a processor in a client device to simulate an online session with a server at an off line client.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 4 is an example of a client initiation of an online CRM session with a remote server.

FIGS. 11A to 11E show various examples of the presentation of CRM data during an offline session.

FIGS. 14A to 14D show various examples of the presentation of "Opportunities" CRM data during an offline session.

FIG. 16 illustrates an example of a process flow for parsing a SOAP request.

FIG. 18 shows an example of a process flow for a Write-Query Response according to one embodiment.

DETAILED DESCRIPTION

General Overview

Systems and methods are provided for simulating an online session between the client and a remote server when the client is offline. The client includes a local interface that can communicate with the remote server. During an online session, the data and the functional logic that is invoked to manipulate the data reside on the remote server. As such, the user transmits instructions to view, create, update, delete, or otherwise modify portions of data through the local interface and subsequently through the underlying network. These instructions are ultimately received at the remote server, which then invokes the proper functional logic to perform the instructions in order to manipulate the data.

Systems and methods are also provided for simulating a web services API to access information when the client is offline. This is done, in one aspect, by implementing an identical API to the web services API that is typically accessed over the internet, but offline. The client program talks to a single API, and that API determines whether to direct requests to a local database (which can later be synchronized with the online system) if the client is offline, or directly against the online system (e.g., if the client is connected via the Internet). In certain aspects, the remote server and client system are components of a multi-tenant database system that allows the client system to access data and applications stored in, or hosted by, the multi-tenant database system over a network connection.

Figure 1:
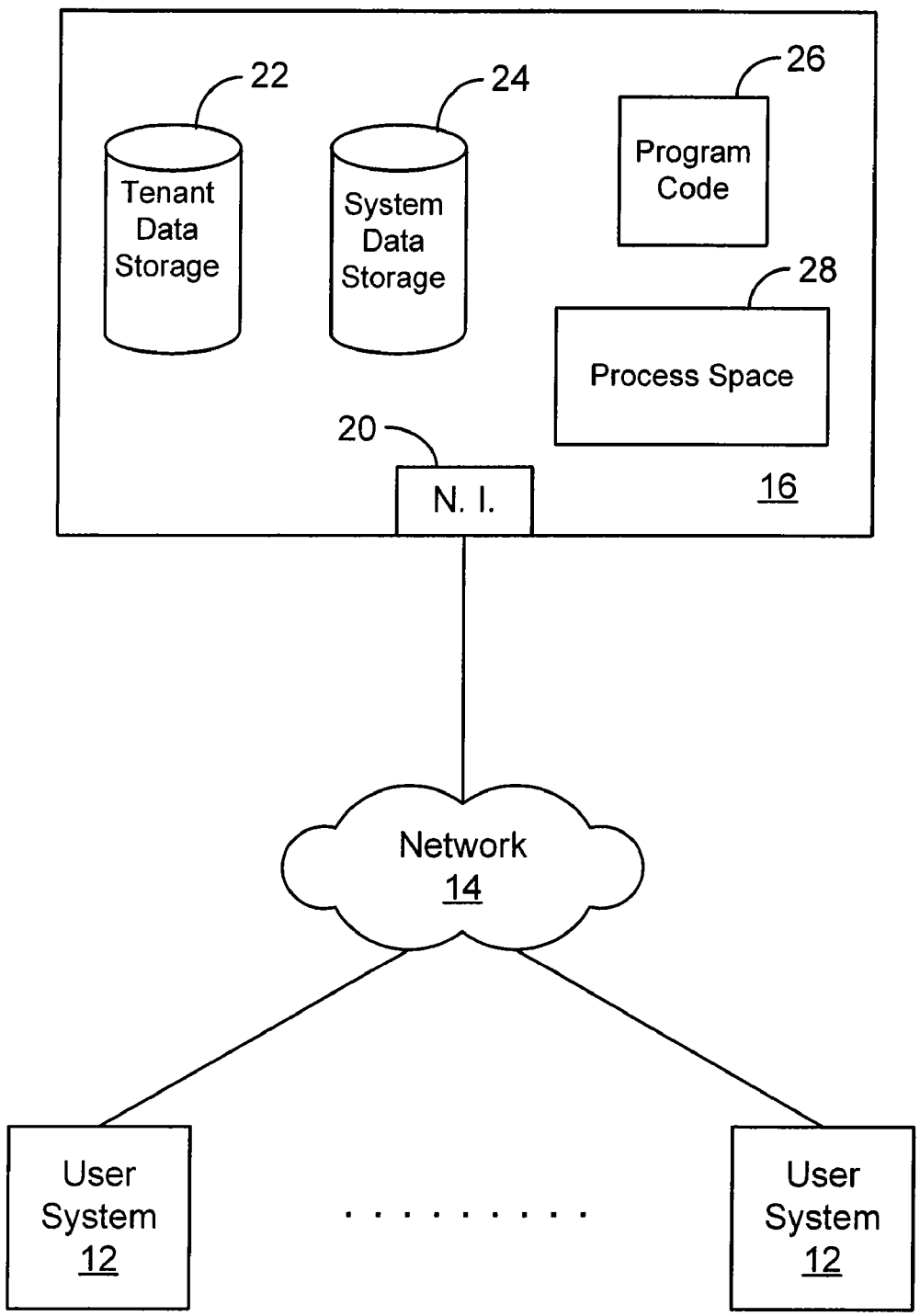
FIG. 1 illustrates an environment wherein a multi-tenant database system might be used.

FIG. 1 illustrates an environment wherein a multi-tenant database system might be used. As illustrated in FIG. 1 (and in more detail in FIG. 2) any user or "client" systems 12 might interact via a network 14 with a multi-tenant database system (MTS) 16. The users of those user systems 12 might be users in differing capacities and the capacity of a particular user system 12 might be entirely determined by permissions (permission levels) for the current user. For example, where a salesperson is using a particular user system 12 to interact with MTS 16, that user system has the capacities allotted to that salesperson. However, while an administrator is using that user system to interact with MTS 16, that user system has the capacities allotted to that administrator. In systems with an hierarchical role model, users at one permission level may have access to applications, data and database information accessible by a lower permission level user, but may not have access to certain applications, database information and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages to and from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In one aspect, the system shown in FIG. 1 implements a web-based customer relationship management (CRM) system. For example, in one aspect, MTS 16 includes application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept logically separate from that of other tenants so that one tenant does not have access to another's data, unless such data is expressly shared. In preferred aspects, system 16 implements applications other than, or in addition to, a CRM application. For example, system 16 may provide tenant access to multiple hosted (standard and custom) applications, including a CRM application.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application hosting service. Additional processes that may execute on MTS 16 include database indexing processes.

Several elements in the system shown in FIG. 1 include conventional, well-known elements that need not be explained in detail here. For example, each client system 12 could include a desktop personal computer, workstation, laptop, PDA, cell phone, or any wireless access protocol (WAP) enabled device or any other computing device capable of interfacing directly or indirectly to the Internet or other network connection. Client system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of client system 12 to access, process and view information, pages and applications available to it from MTS 16 over network 14. Each client system 12 also typically includes one or more user interface devices, such as a keyboard, a mouse, touch screen, pen or the like, for interacting with a graphical user interface (GUI) provided by the browser or other application on a display (e.g., monitor screen, LCD display, etc.) in conjunction with pages, forms, applications and other information provided by MTS 16 or other systems or servers. For example, the user interface device can be used to access data and applications hosted by MTS 16, and to perform searches on stored data, and otherwise allow a user to interact with various GUI pages that may be presented to a user.

As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each client system 12 and all of its components are operator configurable using applications, such as a browser, including computer code run using a central processing unit such as an Intel Pentium® processor or the like. Similarly, MTS 16 (and additional instances of MTS's, where more than one is present) and all of their components might be operator configurable using application(s) including computer code run using a central processing unit such as an Intel Pentium® processor or the like, or multiple processor units. Computer code for operating and configuring MTS 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, any other markup language, Java™, JavaScript, any other scripting language such as VBScript, and many other programming languages as are well known. (Java™ is a trademark of Sun Microsystems, Inc.)

According to one embodiment, each MTS 16 is configured to provide web pages, forms, applications, logic, APIs, data and media content to client systems 12 to support the access (online and offline) by client systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
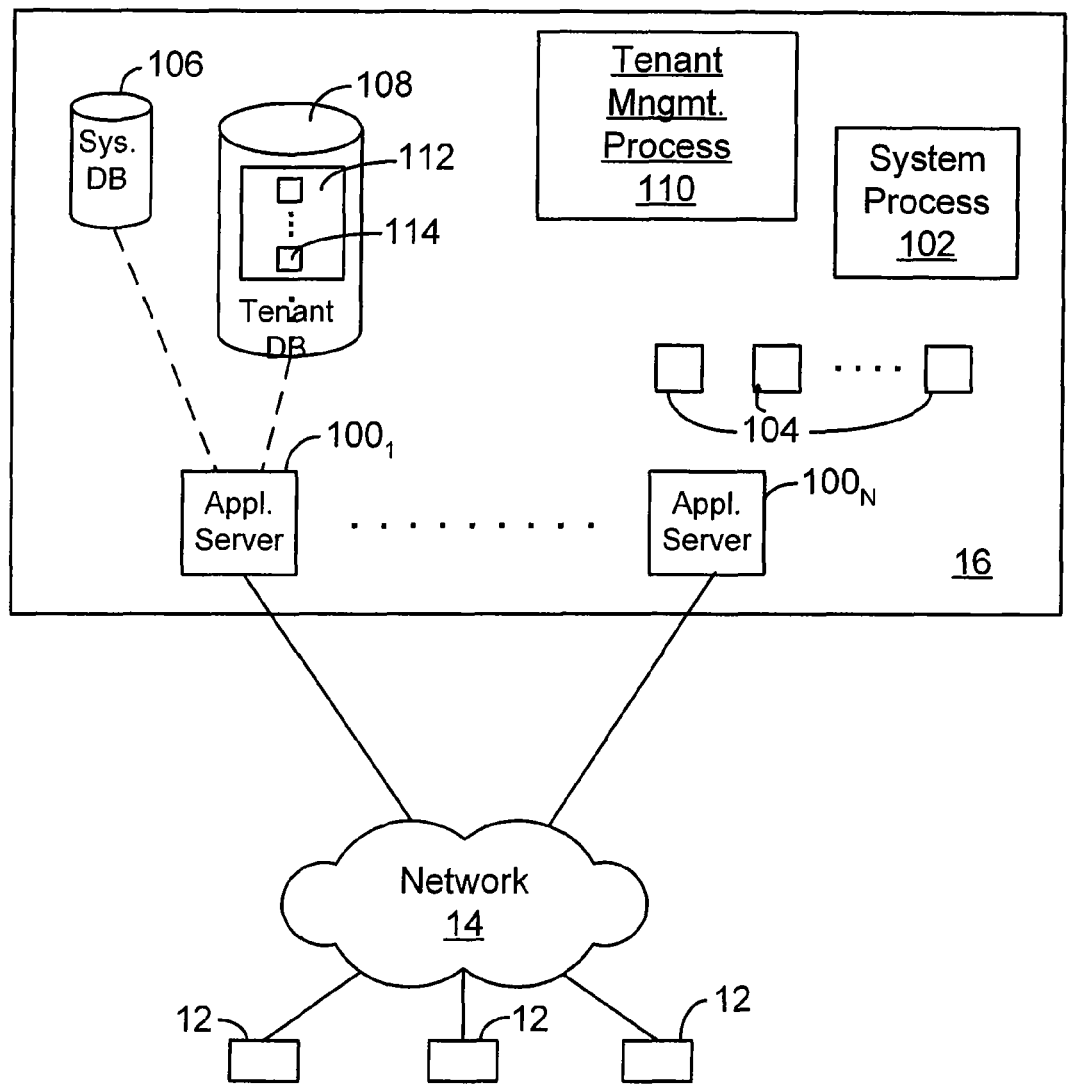
FIG. 2 illustrates elements of FIG. 1 and various interconnections in more detail.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In aspects, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of, and access to, different objects, data and applications across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are additional critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. For example, in one aspect MTS 16 (e.g., an application server 100 in MTS 16) generates automatically a SQL query including one or more SQL statements designed to access the desired information.

Each database can generally be viewed as a collection of objects, such as a set of logical tables, containing data placed into predefined categories. A "table" is one representation of a data object, and is used herein to simplify the conceptual description of objects and custom objects according to the present invention. It should be understood that "table", "entity" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, entitled "Custom Entities and Fields In a Multi-Tenant Database System," filed Apr. 2, 2004, which is hereby incorporated by reference, teaches systems and methods for creating custom objects as well as customizing standard objects in a multi-tenant database system.

The following will first describe the structure of an online session that may be simulated by an offline session in accordance with aspects and embodiments of the present invention. The structure of the offline session, itself, is then described. Following the description of the offline session, preparation of the client prior to conducting such offline sessions (e.g., installation and synchronization phases) is described.

Online Session

Figure 3:
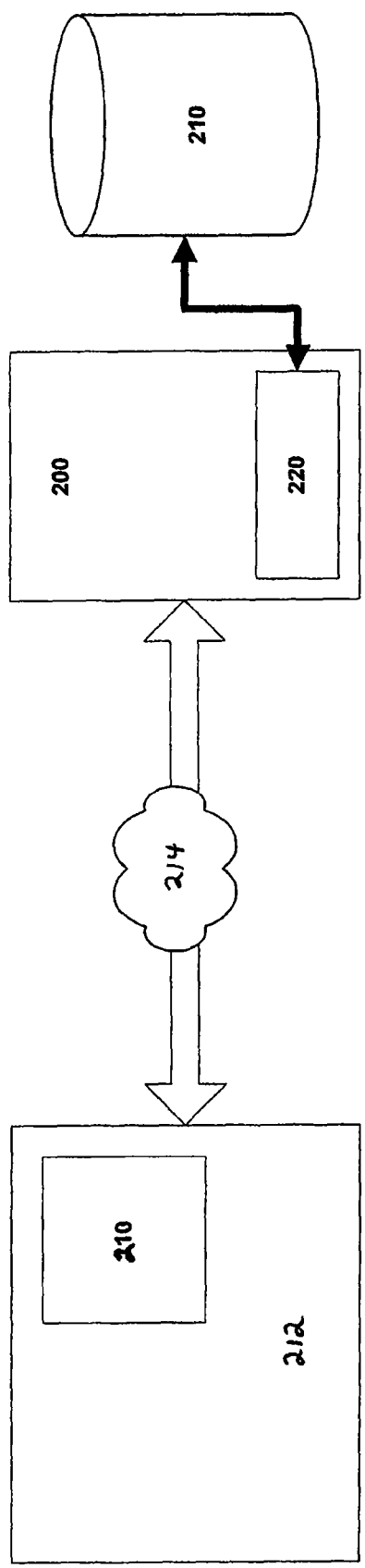
FIG. 3 is a diagram illustrating an online session between a client with a local interface and a remote server with a relational database and functional logic.
Figure 2:
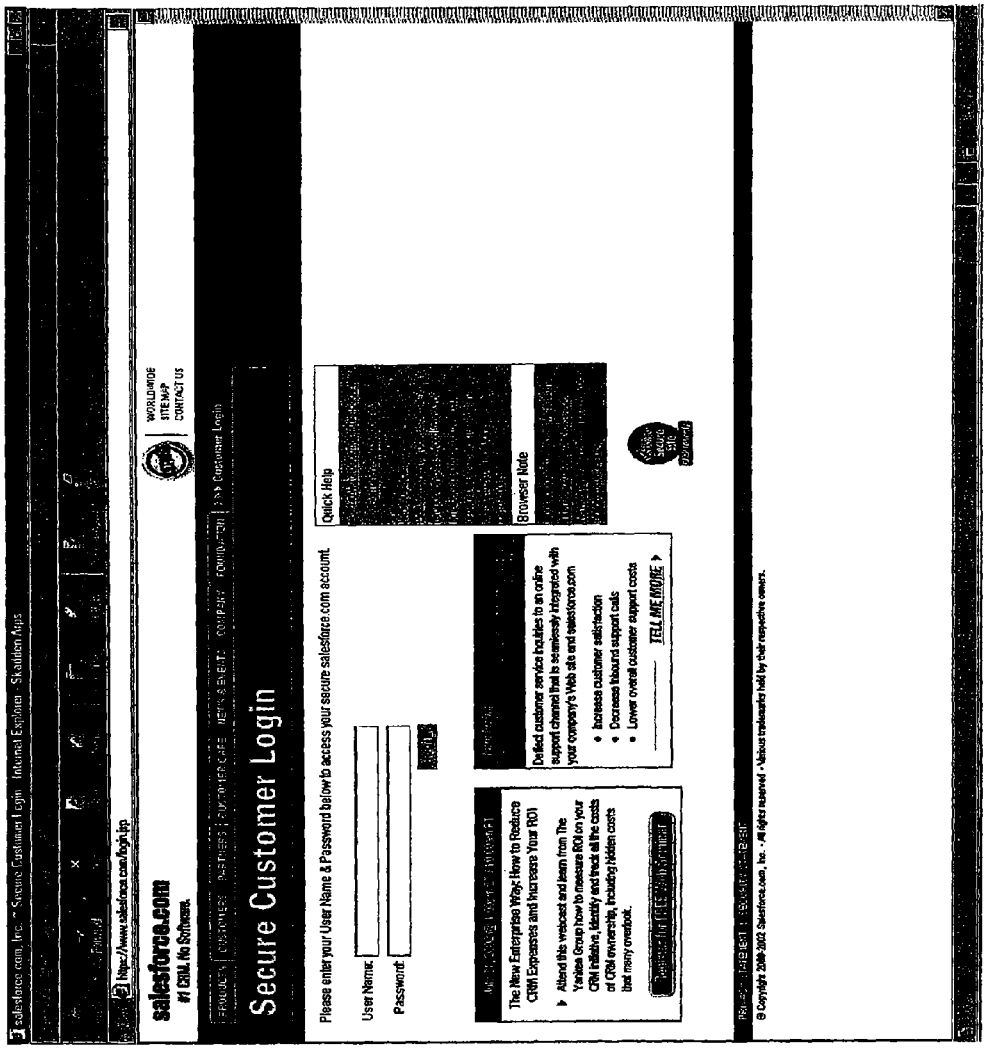

Referring to the drawings, FIG. 3 illustrates an online session between a client 212 and a remote server 200, such as a server in MTS 16. The client includes a local interface 210 while the remote server 200 includes a database 215 and functional logic 220 that is invoked to manipulate the data residing in the database 215. The client 212 establishes communication channels through a network 214 that connects the client 212 to the remote server 200.

In one environment, the network 214 used by the online session may be the Internet. In such an environment, the client 212 may be a laptop or desktop computer and the local interface. Local interface 210, in one aspect, includes a web browser such as Internet Explorer® or Netscape Navigator®. The functional logic 220 at the remote server 200, in one aspect, is invoked through an underlying application or specification such as a CGI program (including, for example, scripts such as Perl), Java servlet (including, for example, JavaServer Pages, or JSP, technology), daemon, service, system agent, server API solution (including, for example, ISAPI or NSAPI) or any other technique or technology known in the art. The database 215, in certain aspects, includes a relational database management system (RDBMS) such as Oracles or DB2®. The communication channels between the local interface 210 and the remote server 200 may be governed by the HTTP protocol. For example, by selecting various options from a web page, a user transmits instructions in the form of an HTTP message through the Internet to the remote server. Upon receiving the HTTP message, the underlying program, component, or application at the remote server performs or executes the pertinent functional logic to interact with and manipulate the data in the database in accordance with the instructions. Those skilled in the art will recognize that the foregoing general online client-server scheme is merely illustrative and that various alternatives, possibly exploiting different technologies, standards and specifications, may also be utilized to create an online session over the Internet in accordance with FIG. 3.

Figure 5:
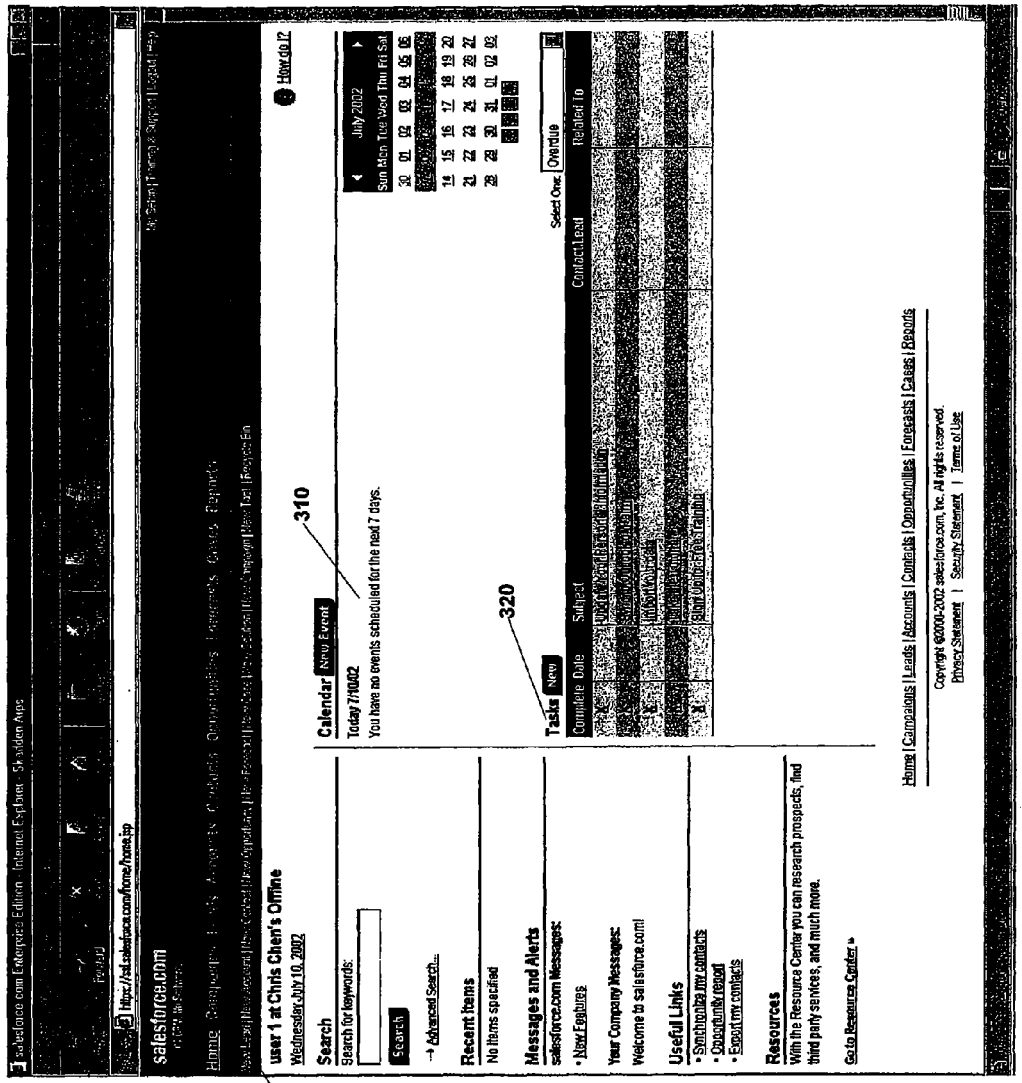
FIG. 5 is an example of the presentation of CRM data on a client's web browser during an online CRM session.

In the field of customer relationship management ("CRM"), such an online client-server scheme can provide the capability to track contacts, leads and customer inquiries without needing a complex software solution on the client side. For example, in one instance of an online CRM session, the user securely logs into the remote server by entering a username and a password through a local web browser, as shown in FIG. 4. Once the user successfully logs into the remote server, the user may be presented with an initial home page that provides access to further features and information. As shown in FIG. 5, for example, the initial home page may provide the user with a brief synopsis of upcoming events 310 and tasks 320. Furthermore, the initial home page provides access 330 to further pages that enable the user the track, manage and organize other data including campaigns, leads, accounts, contacts, opportunities, forecasts, cases, and reports. Those skilled in the art will recognize that FIGS. 4 and 5 are merely examples of one way of presenting CRM information on a local interface and that there exist innumerous ways (e.g., look and feel) to present CRM information on a local interface in accordance with the online client-server scheme presented herein. Furthermore, those skilled in the art will recognize that the online CRM session described herein is merely an example of one area in which the online client-server scheme may be exploited and that there exist innumerous fields and areas in which this online client-server scheme may be exploited.

Offline Session

Figure 6:
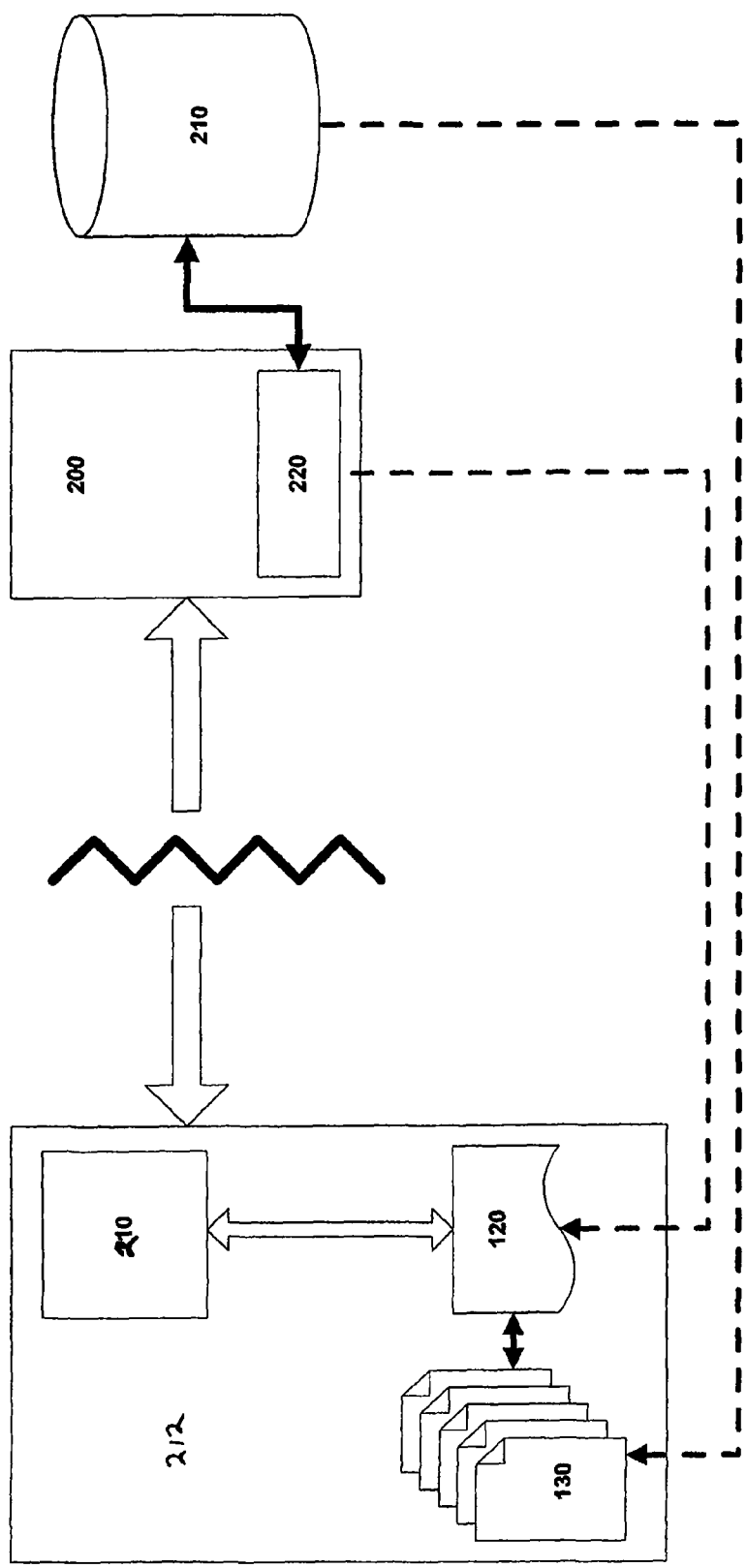
FIG. 6 is a diagram illustrating an offline session.

As shown in FIG. 6, during an offline session, in contrast to an online session as described earlier and illustrated in FIG. 3, the client 212 can no longer establish a communications channel through the network 214 to connect to the remote server 200. As such, at least portions of the data from the database 215 and portions of the functional logic 220 at the remote server 200 are imported to the client 212 so that the client 212 can conduct an offline session in isolation. In FIG. 6, at least a subset 130 of the data 210 is imported to the client 212. Similarly, at least a subset 120 of the functional logic 220 is also imported to the client. This imported functional logic 120 is embedded into a format capable of being interpreted and executed by the local interface.

In an embodiment of an offline session in which the local interface 210 is a web browser, both the data 130 and functional logic 120 may be stored according to an open standards formatting protocol. For example and without limitation, the data 130 may be stored in a single document or a series of documents, possibly including, for example, XSL stylesheets for rendering the data into HTML documents. Similarly, the functional logic 120 may be embedded in a document utilizing a markup language and may be expressed as a scripting language within the document. For example and without limitation, the functional logic 120 could be expressed as JavaScript or VBScript that is embedded in an HTML (HyperText Markup Language) document. As used herein, the term "embedded" may mean either actually embedding the JavaScript (or any other functional logic in a format capable of being interpreted and performed by a web browser) code in an HTML document or other document, or alternatively, accessing a separate JavaScript document by, for example, providing the URL (relative or full address) of the JavaScript source code file in the HTML or other document. As such, when the document is rendered by the web browser, depending upon certain actions taken by the user, certain portions of the functional logic 120 (e.g., JavaScript) may be interpreted and performed or executed by a web browser or other application. Such functional logic 120 may interact with the data 130. For example and without limitation, a user may request to view portions of the data 130 on a web browser. In response to the request, by calling an XSLT (Extensible Stylesheet Language for Transformations) processor that is incorporated into the web browser (e.g., MSXML Parser) or any other comparable XSLT technology residing at the client, the functional logic 120 may access the appropriate portions of the data 130 in conjunction with the appropriate XSL stylesheets, in order to transform or render such data 130 into an HTML document that is visually presented on a web browser.

Preparation of Client for Offline Session

Figure 7:
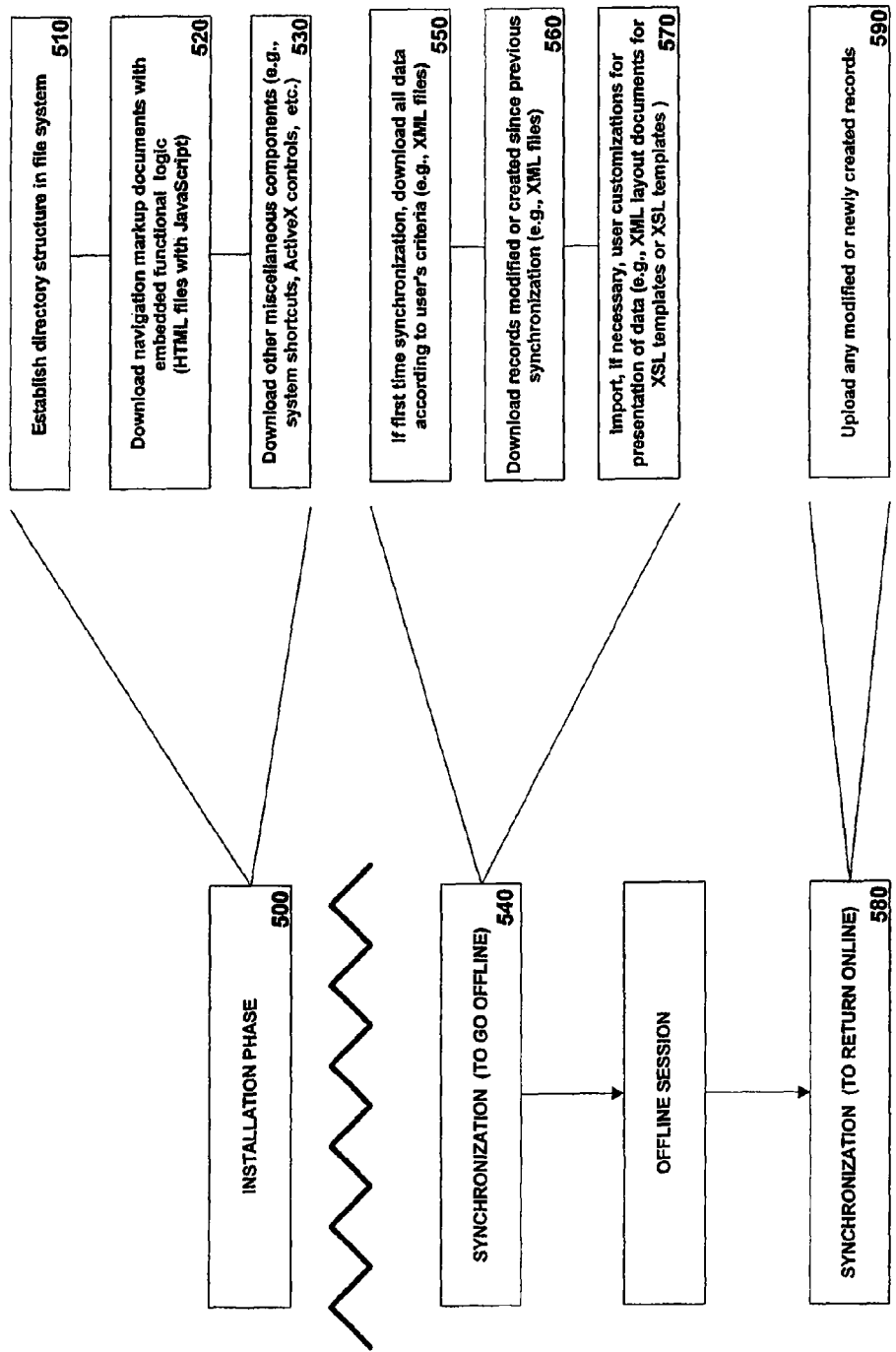
FIG. 7 is a expanded block diagram illustrating one embodiment of the various phases used to provide a client with the capabilities of engaging in an offline CRM session.

Prior to conducting an offline session as described in the foregoing, an initial installation phase and subsequent synchronization sessions may be needed to prepare the client 212 for such an offline session. During the installation phase, an installation or setup executable may be downloaded from the remote server 200 to the client 212. As depicted in FIG. 7, during the installation phase 500, the executable prepares the client for conducting an offline session by, for example and without limitation, (1) establishing a directory structure in the client's file system (Step 510), (2) downloading navigational markup documents with embedded functional logic (e.g., HTML files with embedded JavaScript code or HTML files and related separate JavaScript files) (Step 520); (3) downloading other miscellaneous installation components such as offline APIs and associated logic as will be discussed below as well as other possible components including, for example, static HTML files, stylesheets, XSL templates, ActiveX controls, system shortcuts, local language components and, if not already available, an XML parser that may be integrated into the web browser (e.g., MSXML Parser) (Step 530).

Furthermore, prior to going offline, a user may synchronize the imported subset of data 130 at the client with the data residing in the database 215. For example, if synchronization is occurring for the first time, all data residing in the database 215 that is needed for conducting an offline session may be downloaded from the database 215 to the client 212 (Step 550). This downloaded data may, for example, be defined and customized according to the user's criteria for conducting an offline session. In one implementation, the synchronization process may download this data with formatting instructions. Once such data has been downloaded, XSL templates that are used to visually render the data (e.g., 130 in FIG. 6) on the web browser may be constructed at the client by utilizing the formatting instructions provided. Alternatively; such XSL templates might also be generated at the server and subsequently downloaded to the client. During subsequent synchronization processes prior to going offline 540, as depicted in FIG. 7, modified data records and data records created since the previous synchronization may be downloaded to the client (Step 560). Furthermore, the synchronization process 540 may also provide the opportunity to download (or modify) user customizations (e.g., layout information used to construct XSL templates at the client or the XSL templates themselves) for the visual representation of data and other information on the web browser (Step 570). Similarly, upon re-establishing a connection with the remote server 200, the user may also desire to conduct a synchronization process 580 in order to upload any modified or newly created data records to the remote database 215 (Step 590). In one implementation of the synchronization process, the communication channel between the client 212 and the remote server 200 may be established through the HTTP protocol. Those skilled in the art will recognize that there are alternative synchronization processes other than the one presented in FIG. 7 that may be conducted in accordance with the present invention. For example and without limitation, all synchronization processes, regardless of whether the subsequent activity is an offline session or the re-establishment of an online connection, may simultaneously download modified and newly created data records from the server database to the client as well as upload modified and newly created data records from the client to the server database. Additionally, those skilled in the art will recognize that any variety of techniques and models known in the art may be used implement the synchronization process in order to maintain consistency and coherency while accessing data (e.g., atomic, sequential or causal consistency, etc.).

Figure 8:
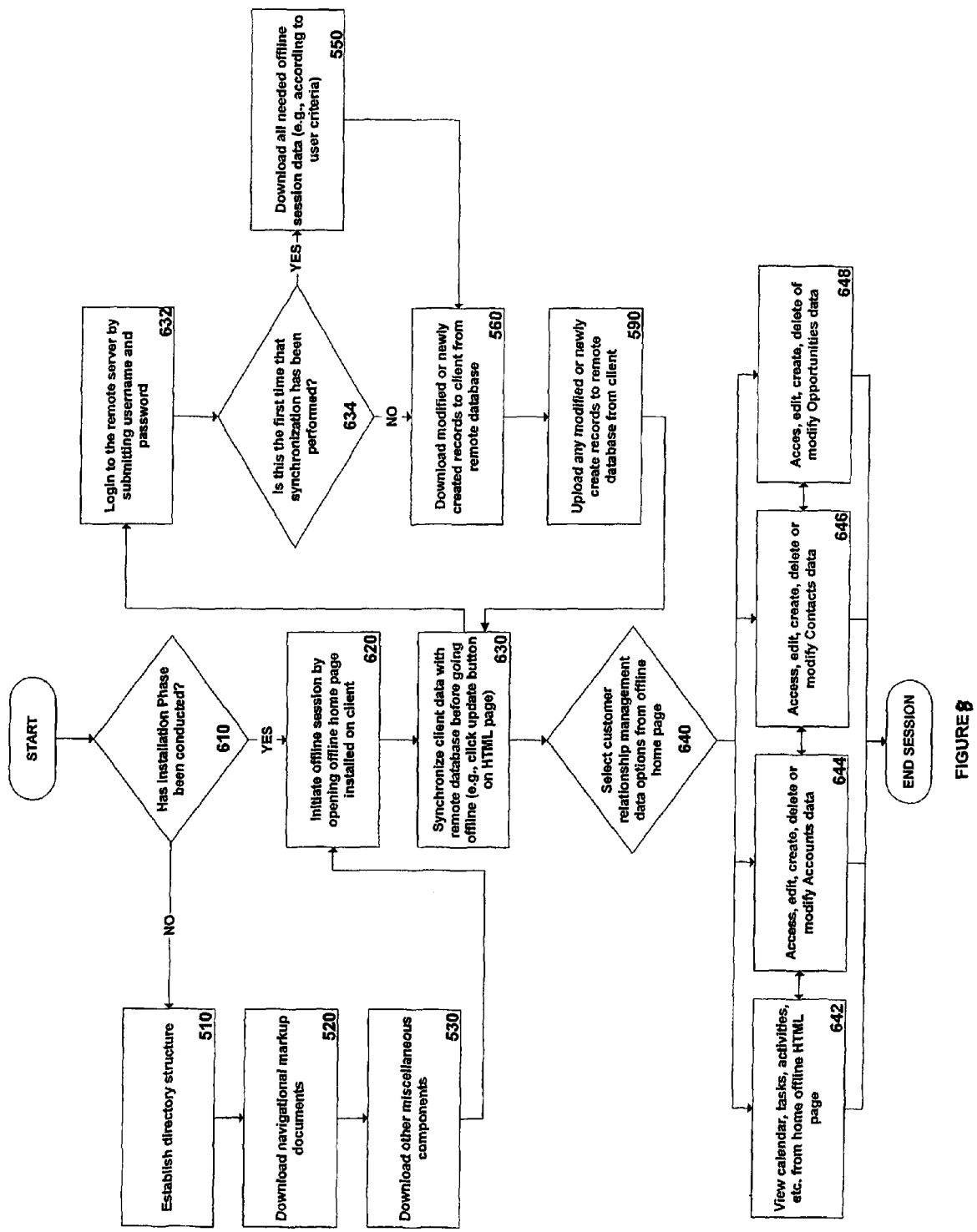
FIG. 8 is a flowchart illustrating one embodiment of a process for conducting an offline CRM session.

FIG. 8 illustrates one embodiment of a process for initiating and conducting an offline CRM session. As depicted, in this embodiment, an initial installation process should be conducted before an offline session can begin (e.g., Steps 610, 510, 520, 530). After installation, a user may initiate an offline session by opening an HTML page downloaded to the client during the installation phase (Step 620). While still online, the user may then synchronize local client data with the remote database before going offline (Step 630 and expanded in Steps 632, 634, 550, 560, 590). As shown in FIG. 8, this may involve downloading data from the remote server (Step 550) as well as uploading data to the remote server (Step 590), and if necessary, an initial download of all offline session data (Step 550). Once synchronization is complete, the user may go offline and manipulate, view, and modify customer relationship data by selecting from various options through the web browser (Step 640). For example and without limitation, the user may view his calendar, tasks, and activities (Step 642). Additionally, data may be organized into certain categories such as accounts, contacts, and opportunities. The user may be able to maneuver through the web browser to access, edit, create, delete, or otherwise modify data within these categories (Steps 642, 644, 646, 648).

Figure 9:
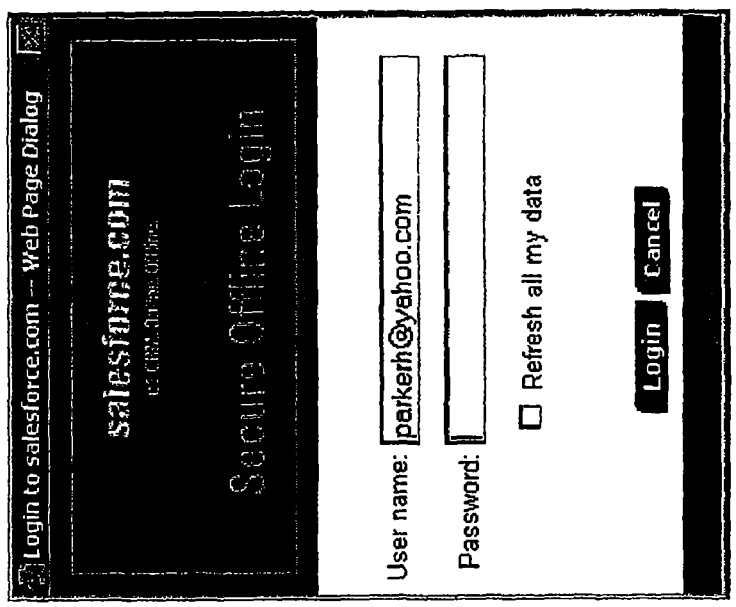
FIG. 9 is an example of a login session to connect to a remote server during a synchronization process.
Figure 10:
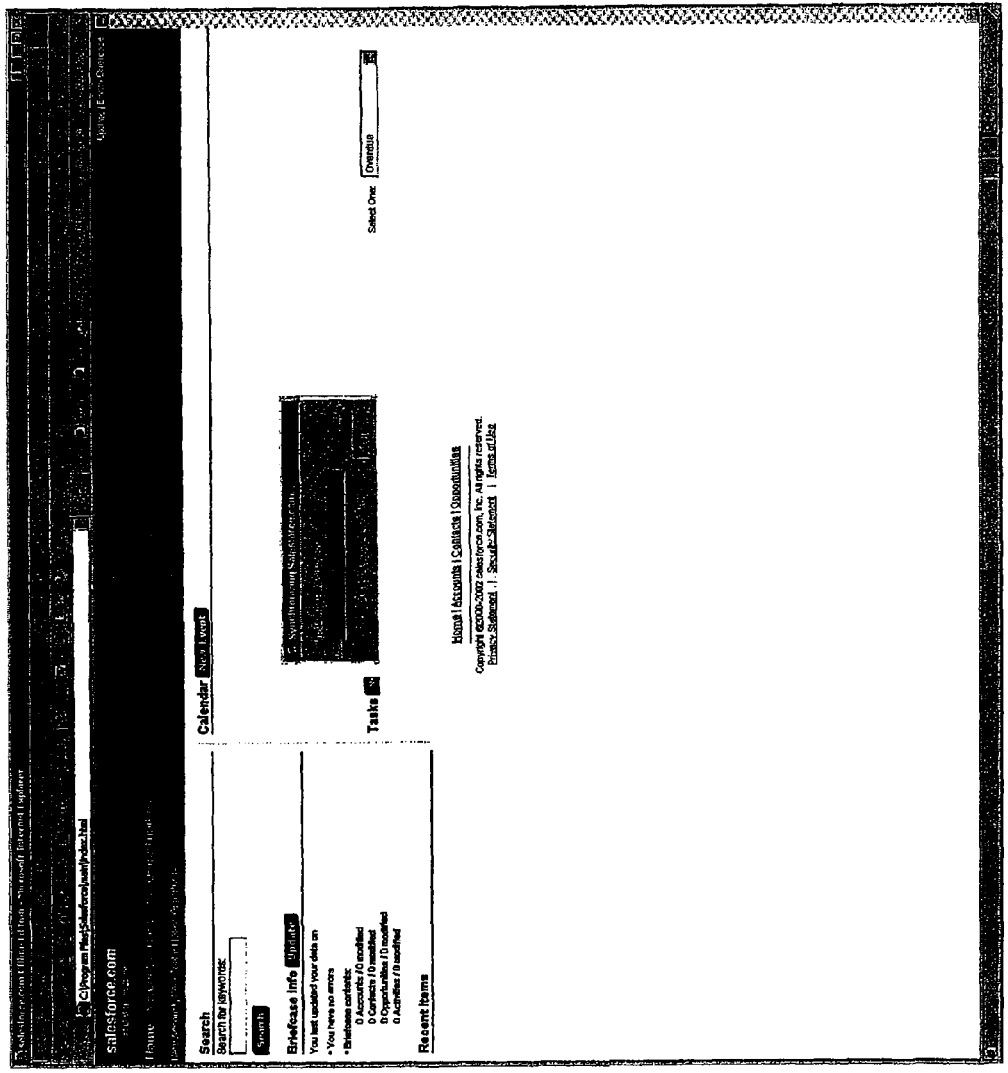
FIG. 10 is an example of a visual representation of a synchronization process with the remote server.
Figure 11A:
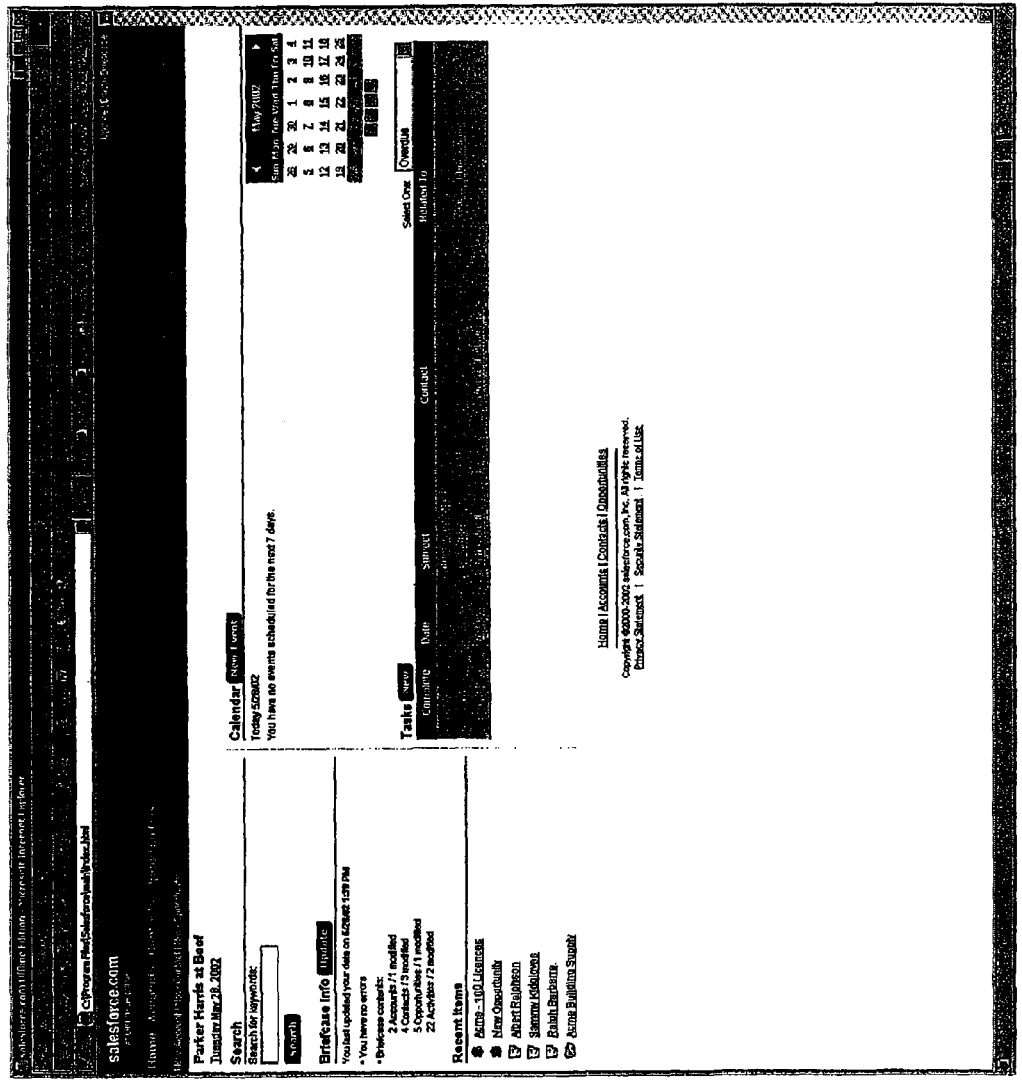
Figure 11B:
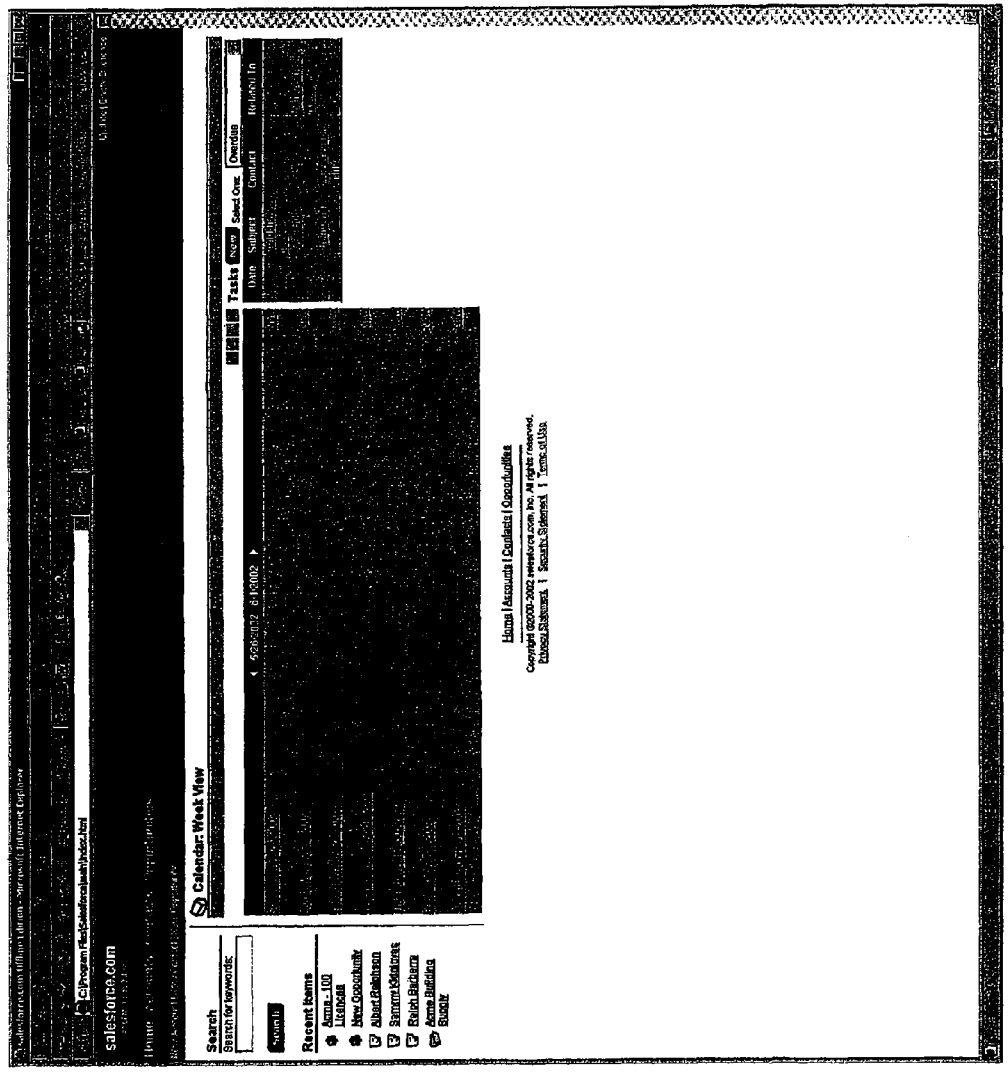
Figure 11D:
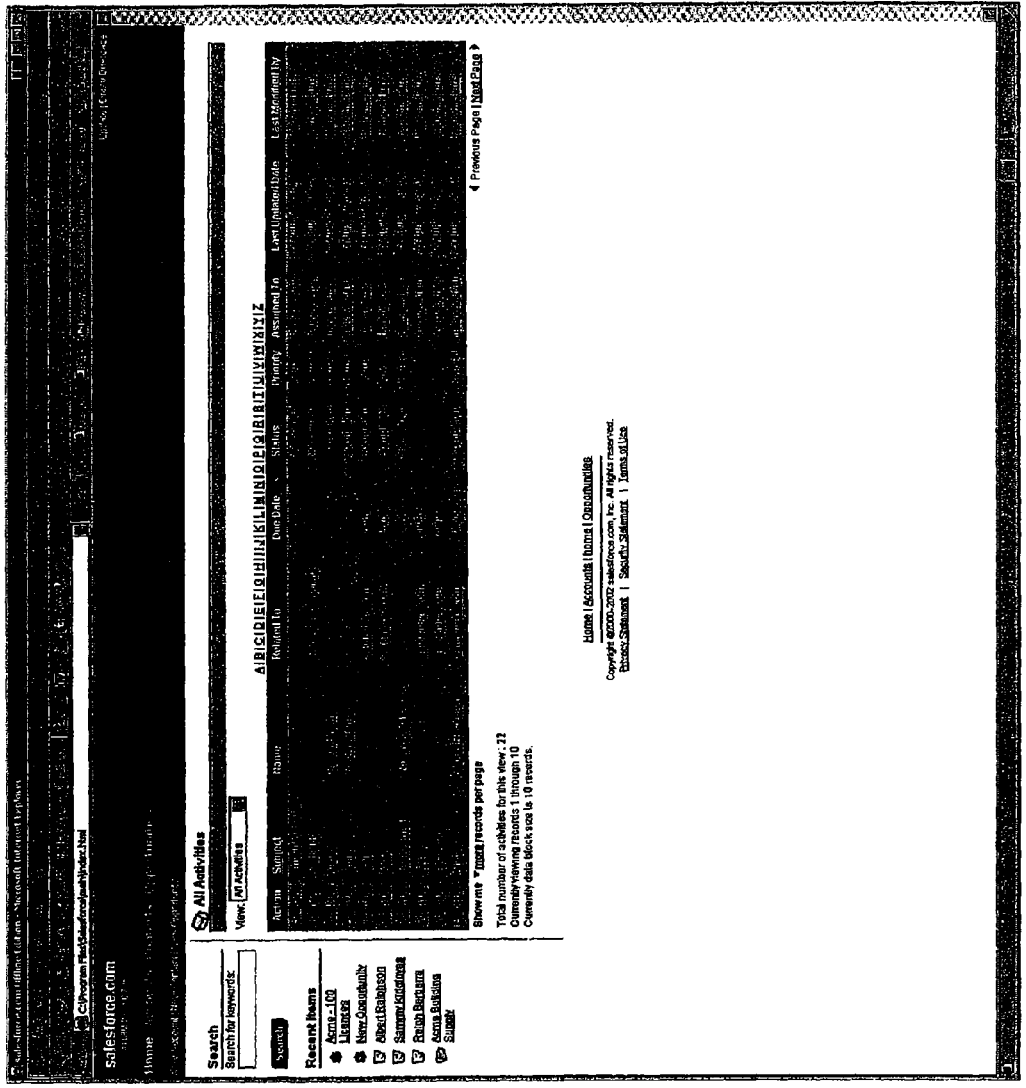
Figure 9E:
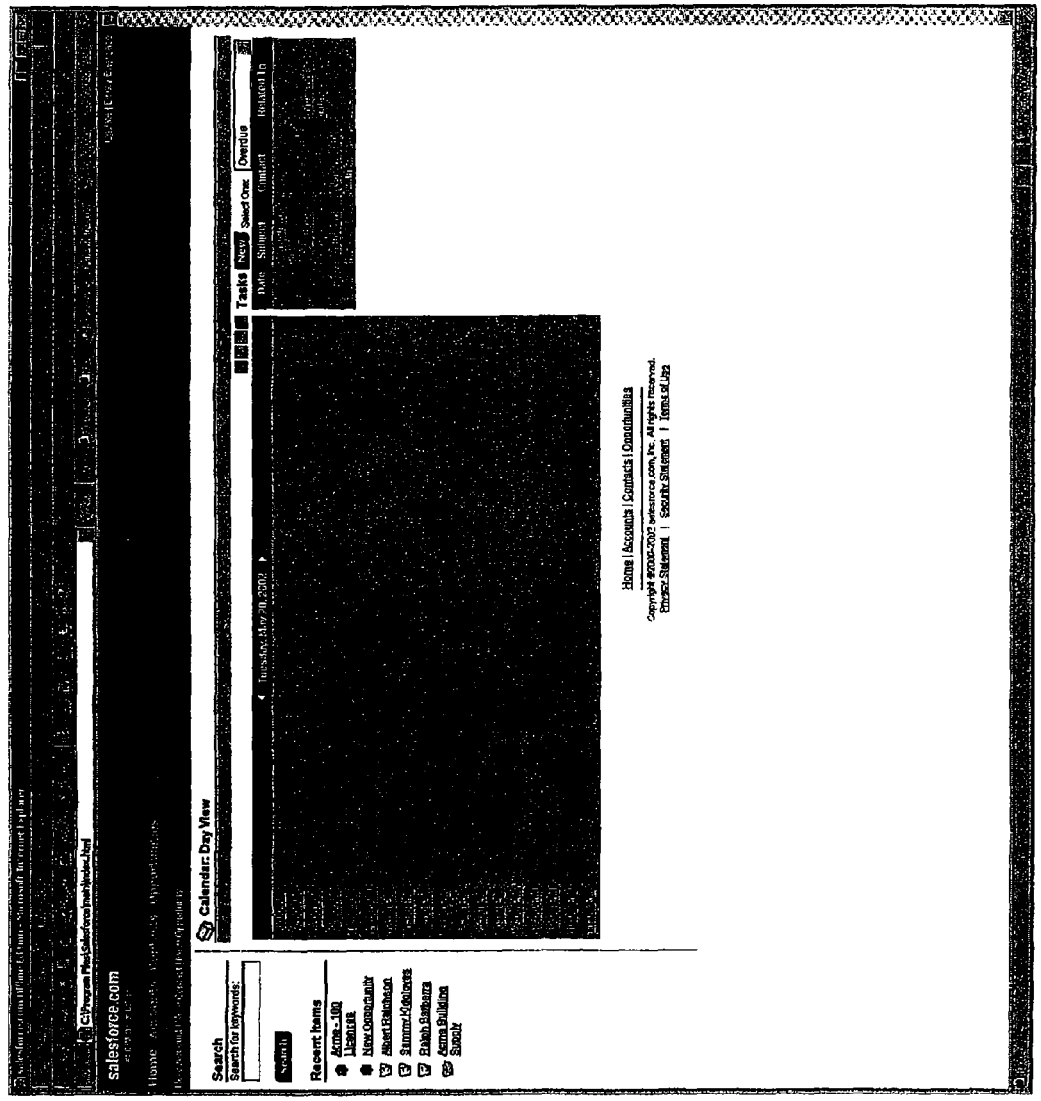
Figure 12A:
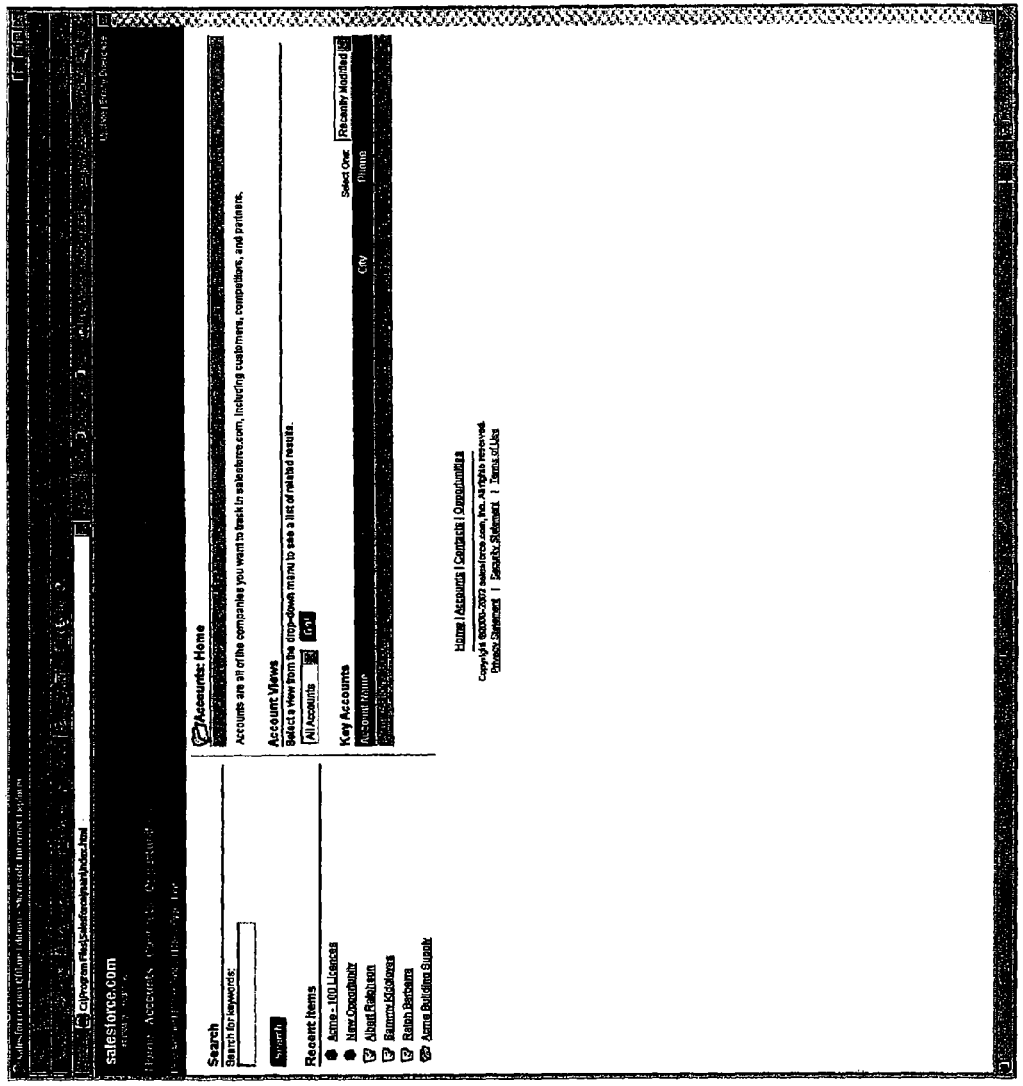
FIGS. 12A to 12D show various examples of the presentation of "Accounts" CRM data during an offline session.
Figure 12B:
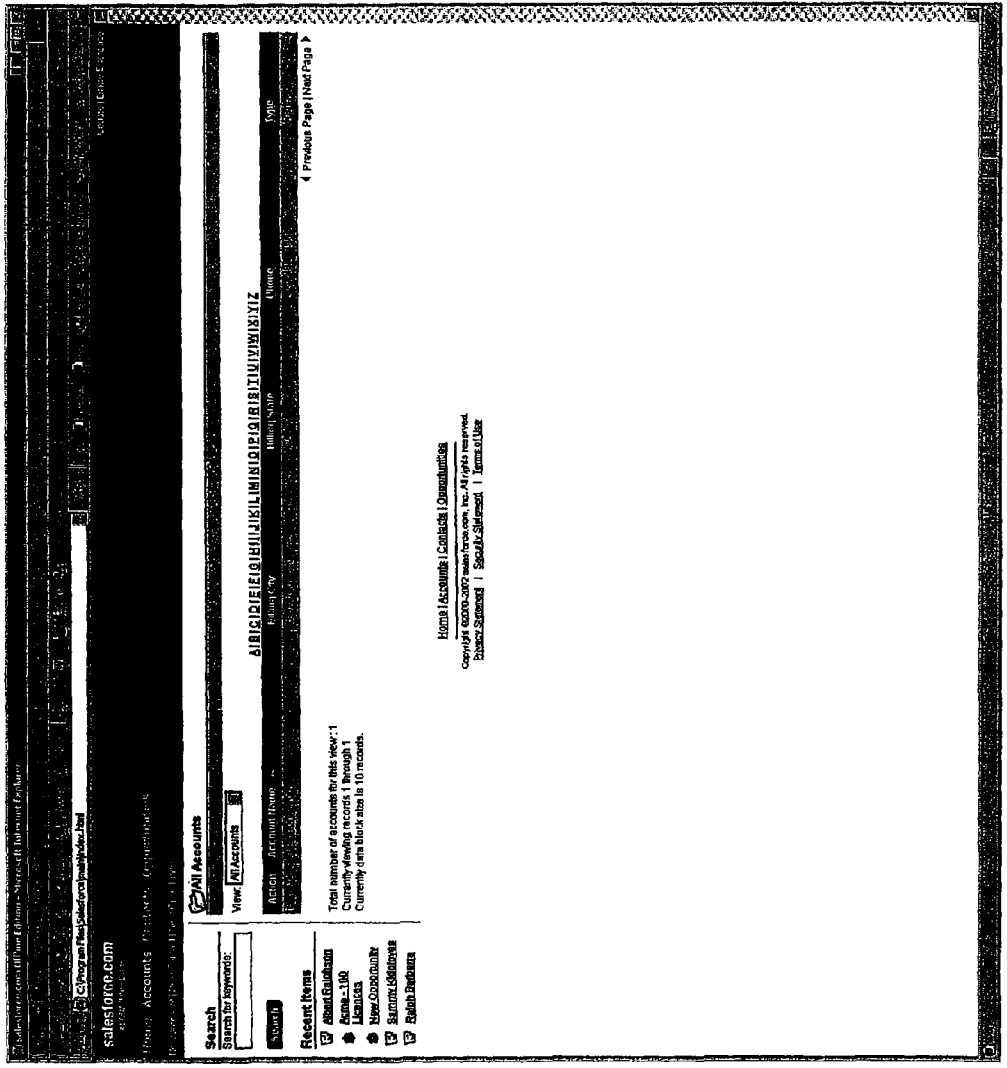
Figure 12C:
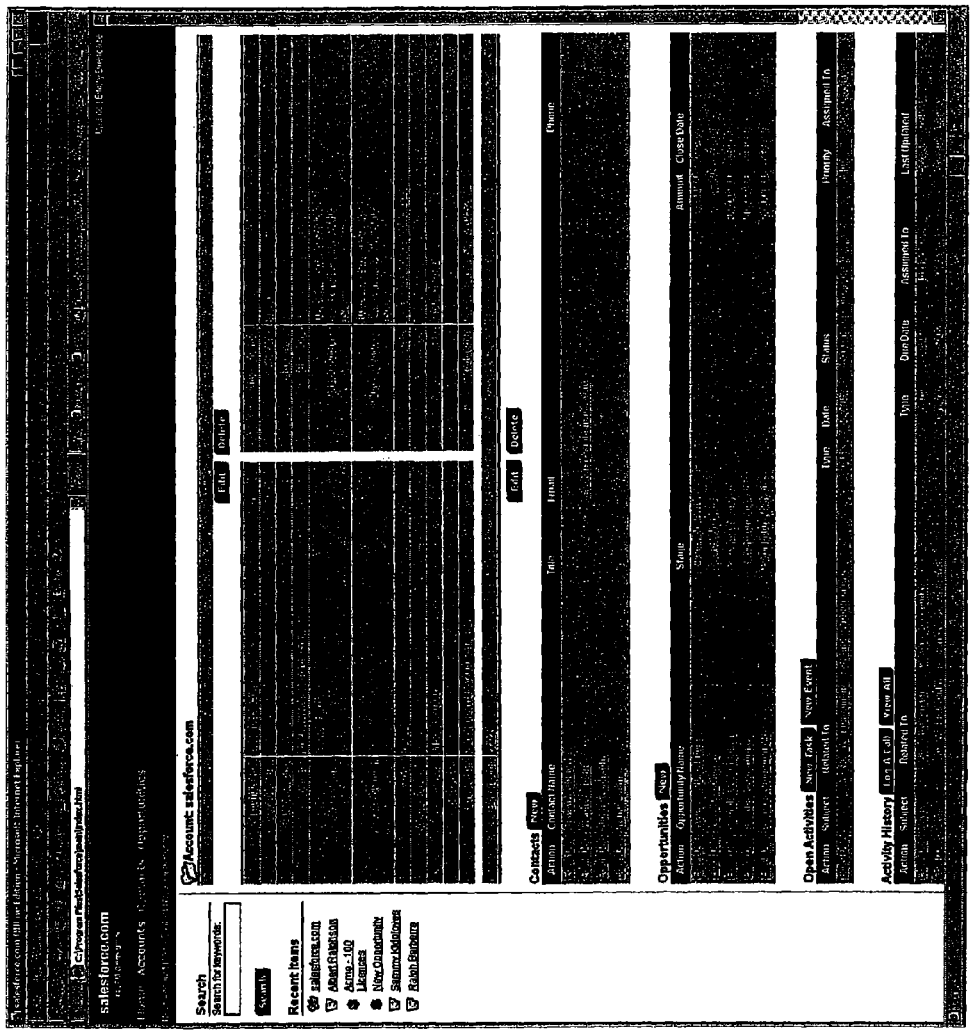
Figure 12D:
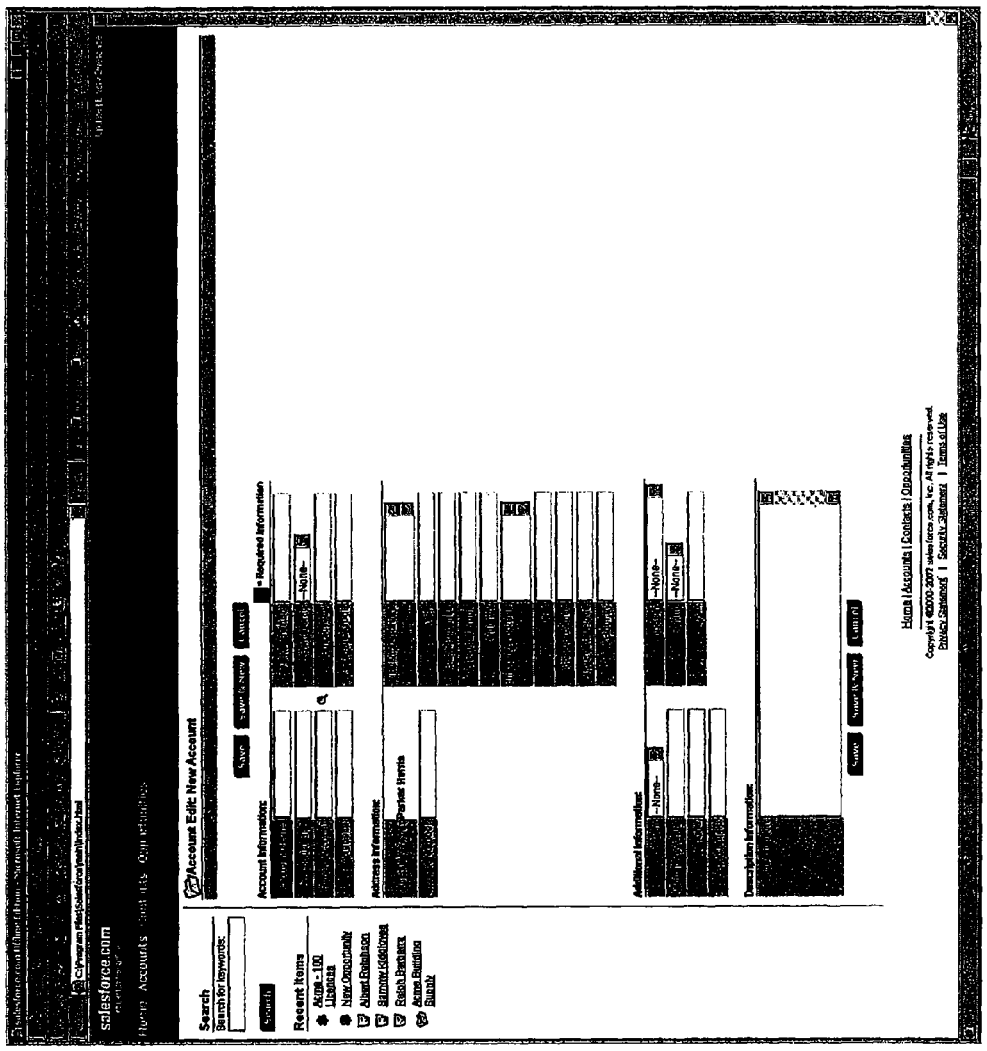
Figure 13A:
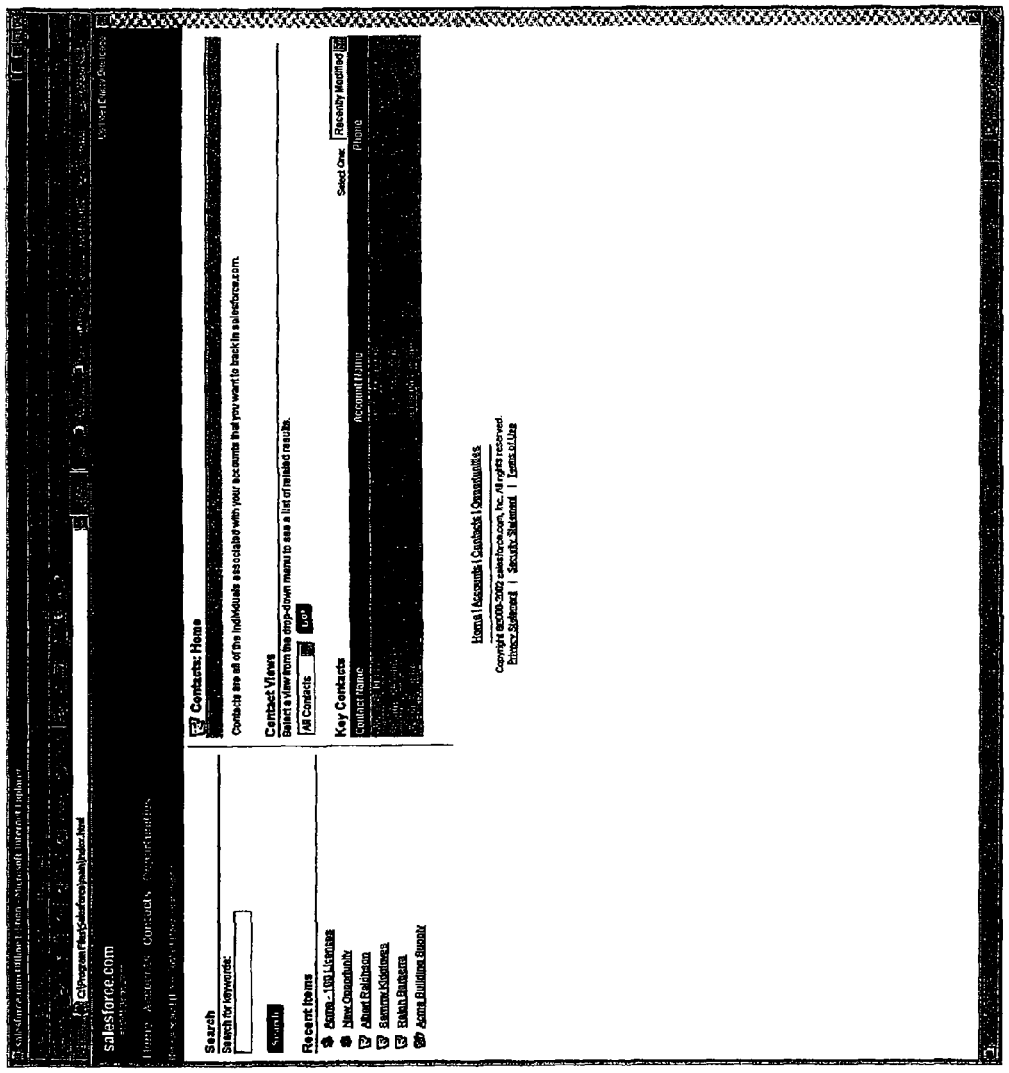
FIGS. 13A to 13D show various examples of the presentation of "Contacts" CRM
Figure 13B:
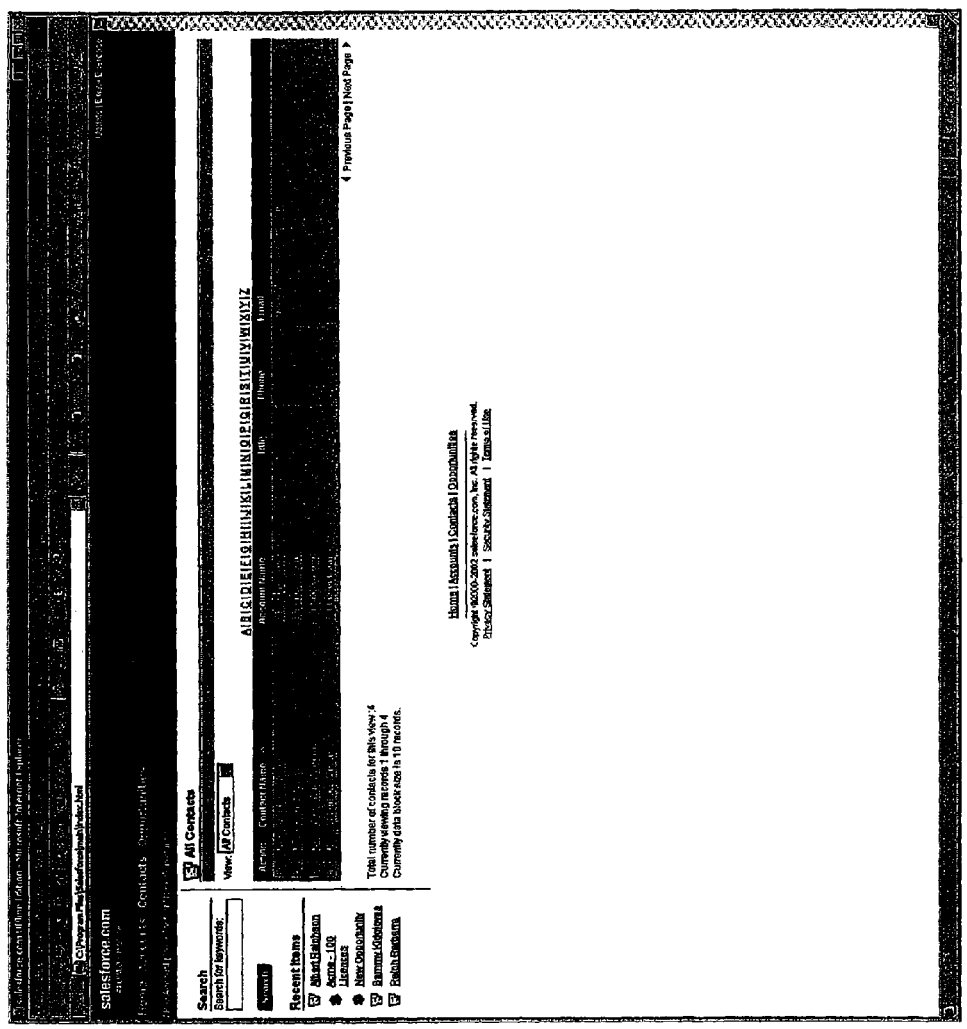
Figure 13C:
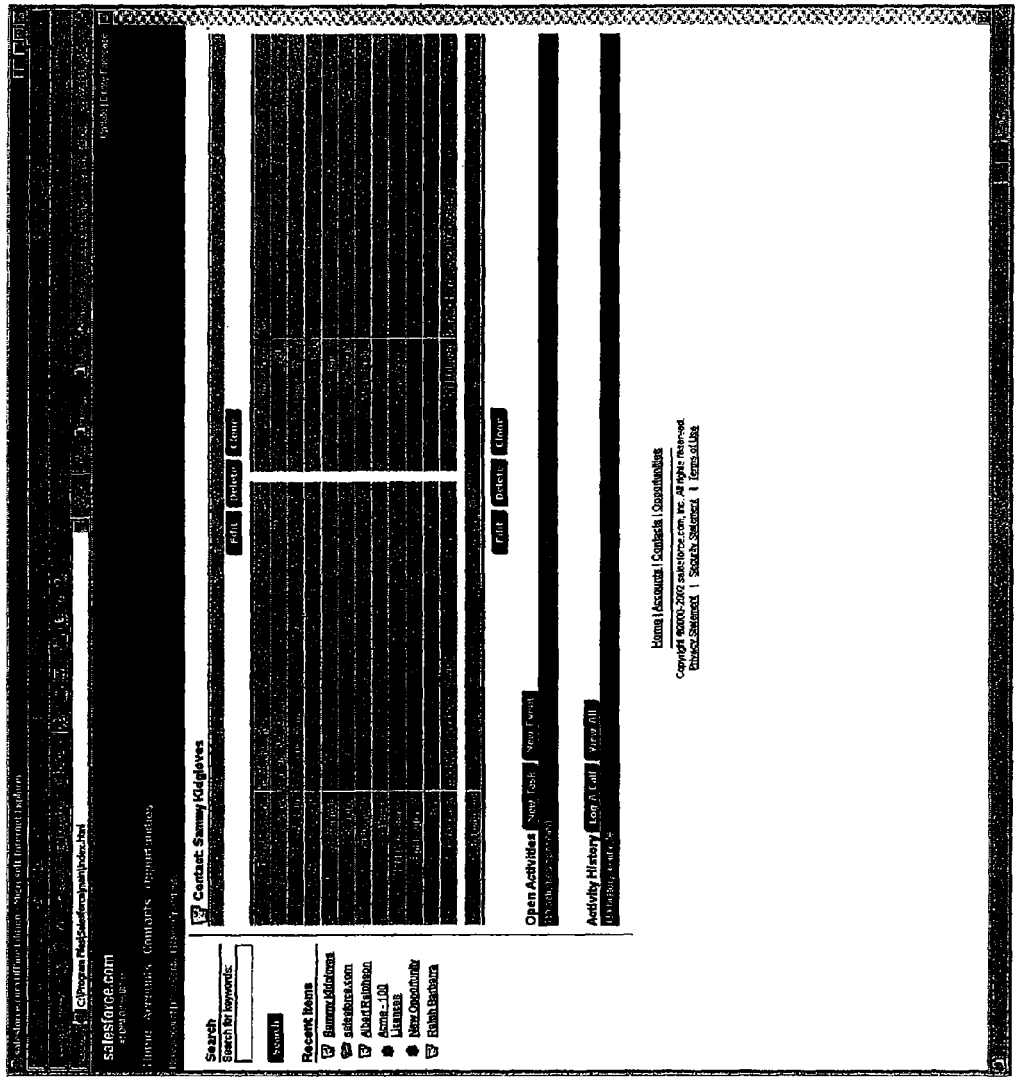
Figure 13D:
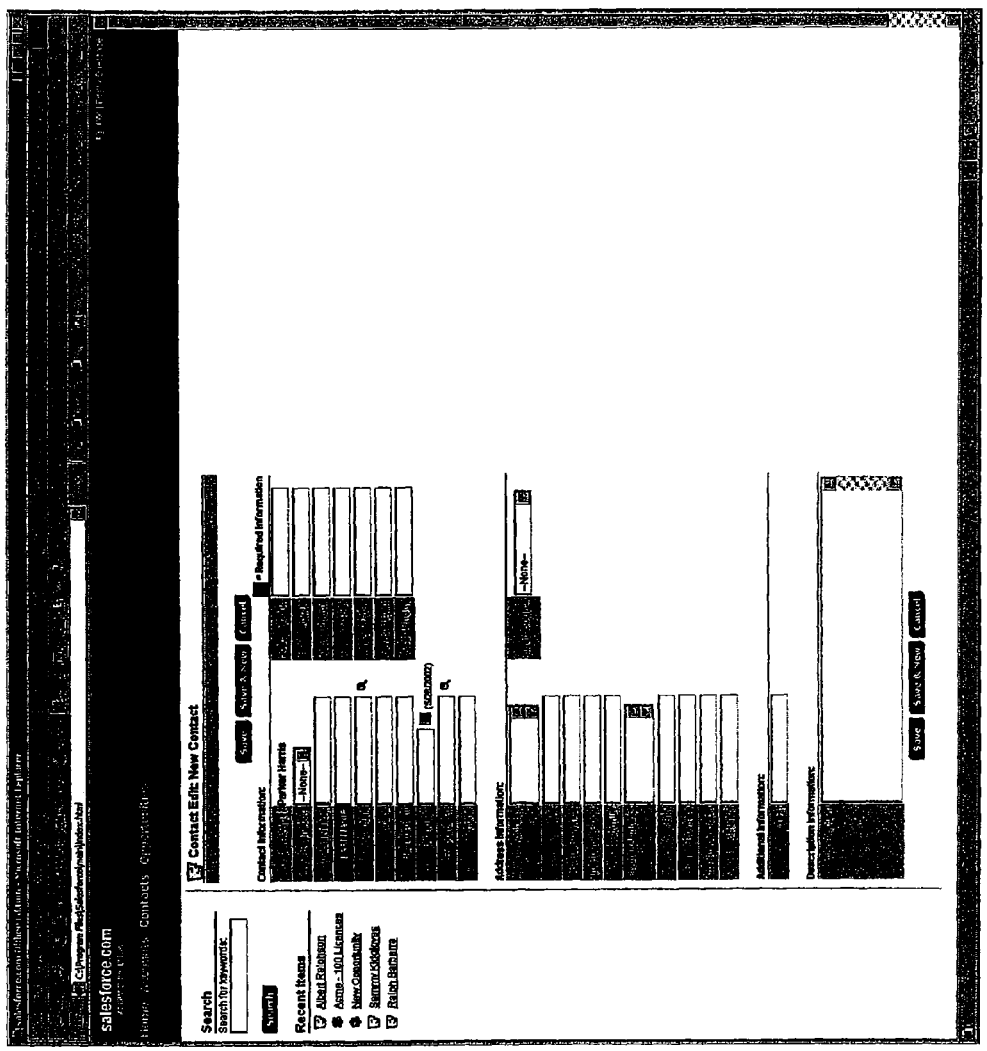

FIGS. 9 to 14D illustrate examples of certain steps in the flowchart of FIG. 8. For example, FIG. 9 illustrates a login interface to access the remote server to initiate a synchronization corresponding to step 632 of FIG. 8. Similarly, FIG. 10 illustrates the synchronization process of downloading modified and newly created records from the remote database as in step 560 of FIG. 8 (and possible uploading of any modified or newly created records to the remote database as in step 590 of FIG. 8). Corresponding to step 642 in, FIG. 8, FIG. 11A illustrates one example of an offline home page and FIGS. 11B to 11E illustrate various other alternative "Home" views that may be accessed by the user during an offline session. Similarly, corresponding to step 644 in FIG. 8, FIGS. 12A to 12C illustrate various views of data organized into an Accounts category. Corresponding to steps 646 and 648 in FIG. 8, FIGS. 13A to 13D illustrate various views of data organized into a Contacts category and FIGS. 14A to 14D illustrate various view of data organized into an Opportunities category, respectively.

In one aspect, the offline database includes two different database schemas. One system schema stores metadata information about entities, and a second "user" schema stores user data for all entities available in offline mode (e.g., Accounts, Opportunities, Custom Objects, etc.).

In one aspect, the user schema includes user data for all synchronized entities such as Accounts, Contacts, Opportunities etc. Each entity is contained in its own table. For example, this schema contains a table "Account" to store accounts data. The schema of each table is the same as the schema available for that table in online mode with the exception that the table stored locally only contains fields that are visible to the user. In one aspect, each entity table is indexed on an "ID" field. In one aspect, each entity table contains an additional enumerated field that indicates the current synchronization status for a given record. The value in the synchronization field is used by the synchronization process to determine which record(s) need to be added or modified, e.g., when a connection is re-established. Possible values for the synchronization field might include: INSERT, UPDATE and COMMITTED. In one aspect, all entity tables have an "ID" field as a primary key. In one aspect, foreign key relationships between entity tables are not stored in the database, but are determined dynamically at run time by the offline logic, e.g., using one or more describe metadata calls (e.g., describeSObject call) that return metadata for the particular object(s) identified in the call(s). For example, in certain aspects, the system maintains the relationships locally and does not rely on the database (remote) to either store the relationship definition or enforce the relationships (e.g., foreign key constraints) When the offline api/client is connected, the schema information is downloaded from the database to local disk or other local storage and uses the information when offline to enforce and apply appropriate object relationships.

Figure 15:
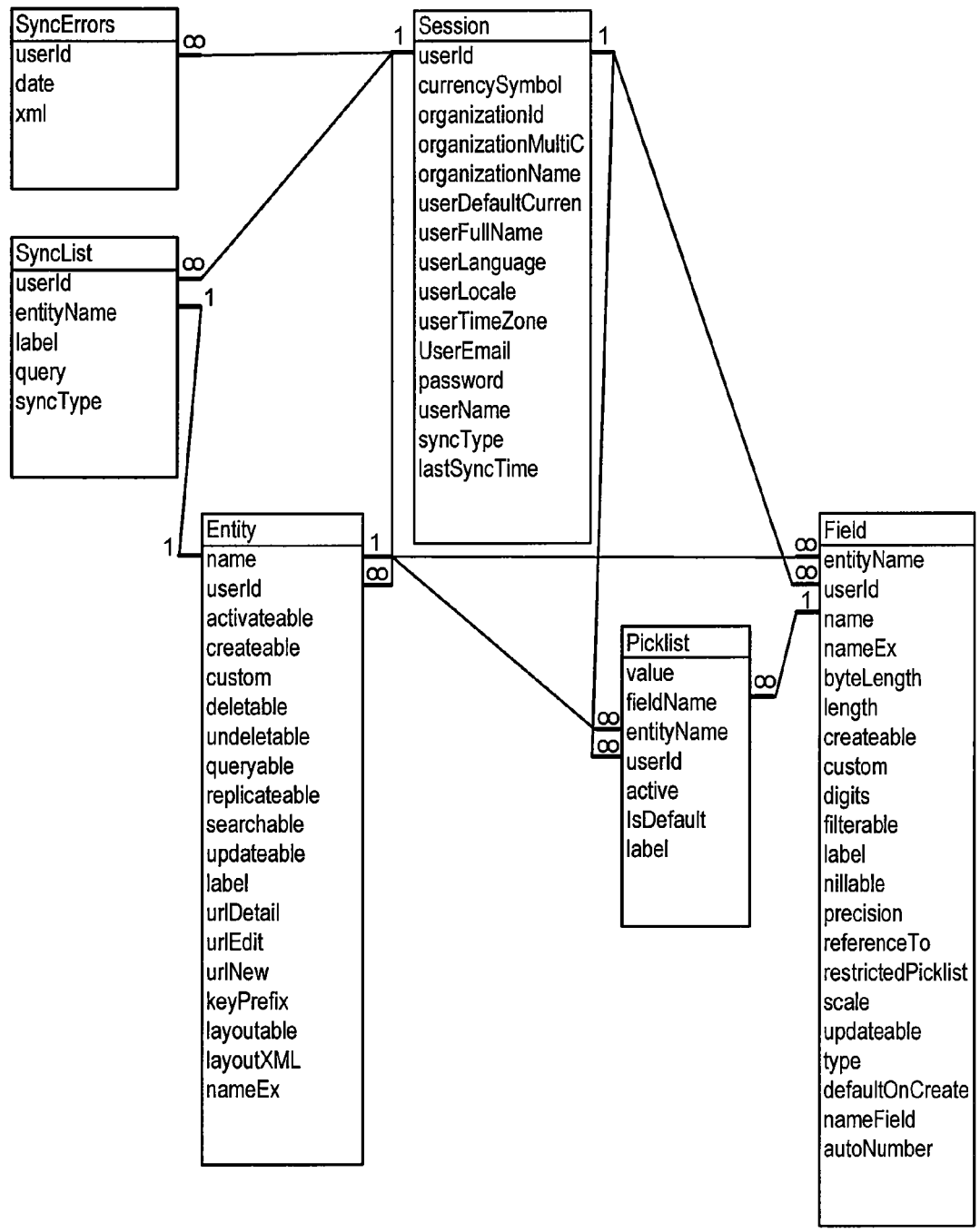
FIG. 15 illustrates an example of a system data model according to one embodiment.

FIG. 15 illustrates an example of a system data model according to one embodiment showing various possible relationships among objects.

Systems and services embodiments provide programmatic access to customer data through Application Programming Interfaces (APIs), accessed over the Internet. These APIs include Web Services APIs such as SOAP (Simple Object Access Protocol) APIs. The APIs typically provide the ability to login, create a new record, update a record, query records, delete records, and operations to retrieve metadata about the customer's schema. Although a system may offer an offline client as discussed above, the information stored offline is not available through APIs that may be called on the client system when offline.

API Simulation

According to one embodiment, an offline logic module includes one or more APIs ("offline APIs") that mirror or simulate the functionality provided by "online" APIs which are able to interact with a remote database system. Before using an offline API, the system typically needs to synchronize with an online web services API. The online web services API provides the necessary metadata information, such as what tables are stored in the local database, what fields are stored in these tables, and how tables are related. This metadata is stored in the local database. In certain aspects, offline modules are written on top of a lightweight relational database, e.g., SQLLite that resides on the client.

To mirror an online API, in one embodiment, an offline logic module includes a lightweight http listener module that is configurable to reside and execute on the client, and which listens at a predefined port. The listener module provides web server functionality to the client when in an offline mode. The listener module becomes the endpoint for offline API calls (e.g., a call such as http://localhost:34234/service/Soap/5.5). Thus, any client application wishing to determine whether to use the online or offline endpoint can easily switch when Internet or network connectivity is not available. For example, in one aspect, the client program makes a determination as to whether to use the offline API or the online API.

In one embodiment, the process flow proceeds as follows:

1. A client program or application, e.g., written using the web services API, first attempts to make a connection to an online endpoint.

2. If an Online connection fails, a connection to the local endpoint is attempted.

3. The local endpoint determines which API call is being made, and executes the required methods against the local, offline database to return a message that is identical to a message that would be received from the remote system.

4. The messages sent to the endpoint are the same messages sent to the online API, so no change is needed to the client program.

Figure 17A:
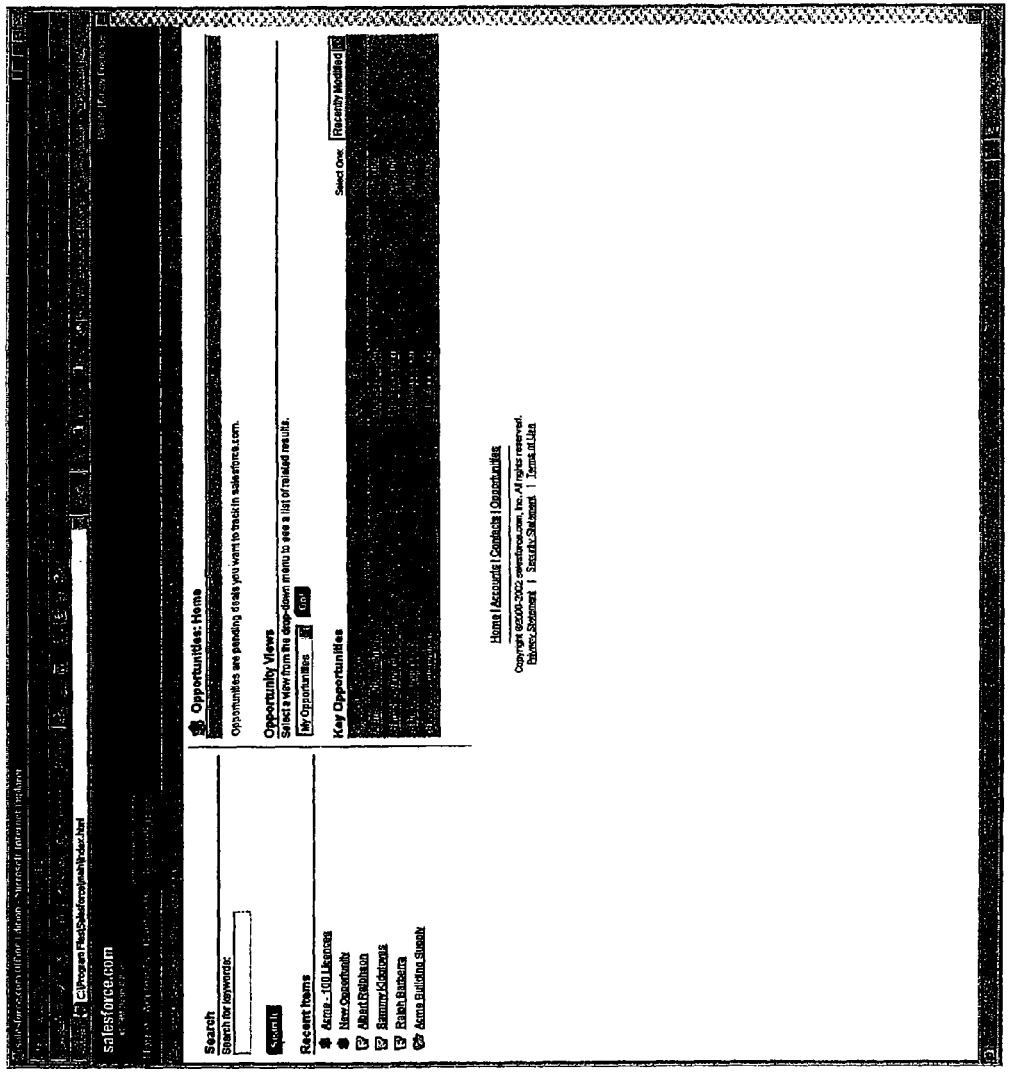
FIG. 17 illustrates an example process flow for a translation tool that translates a SOQL query into a compatible SQL92 query to be run against a local relational database.
Figure 12B:
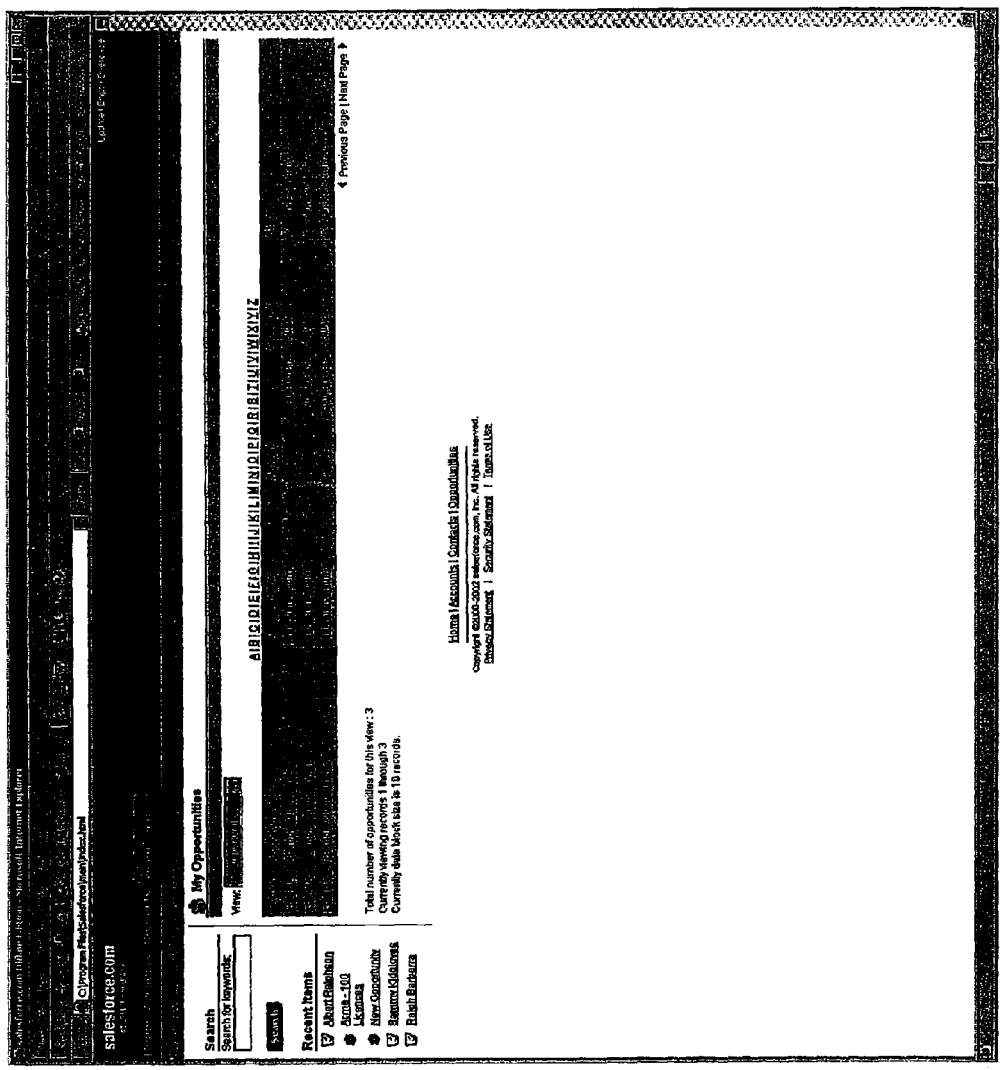
Figure 14C:
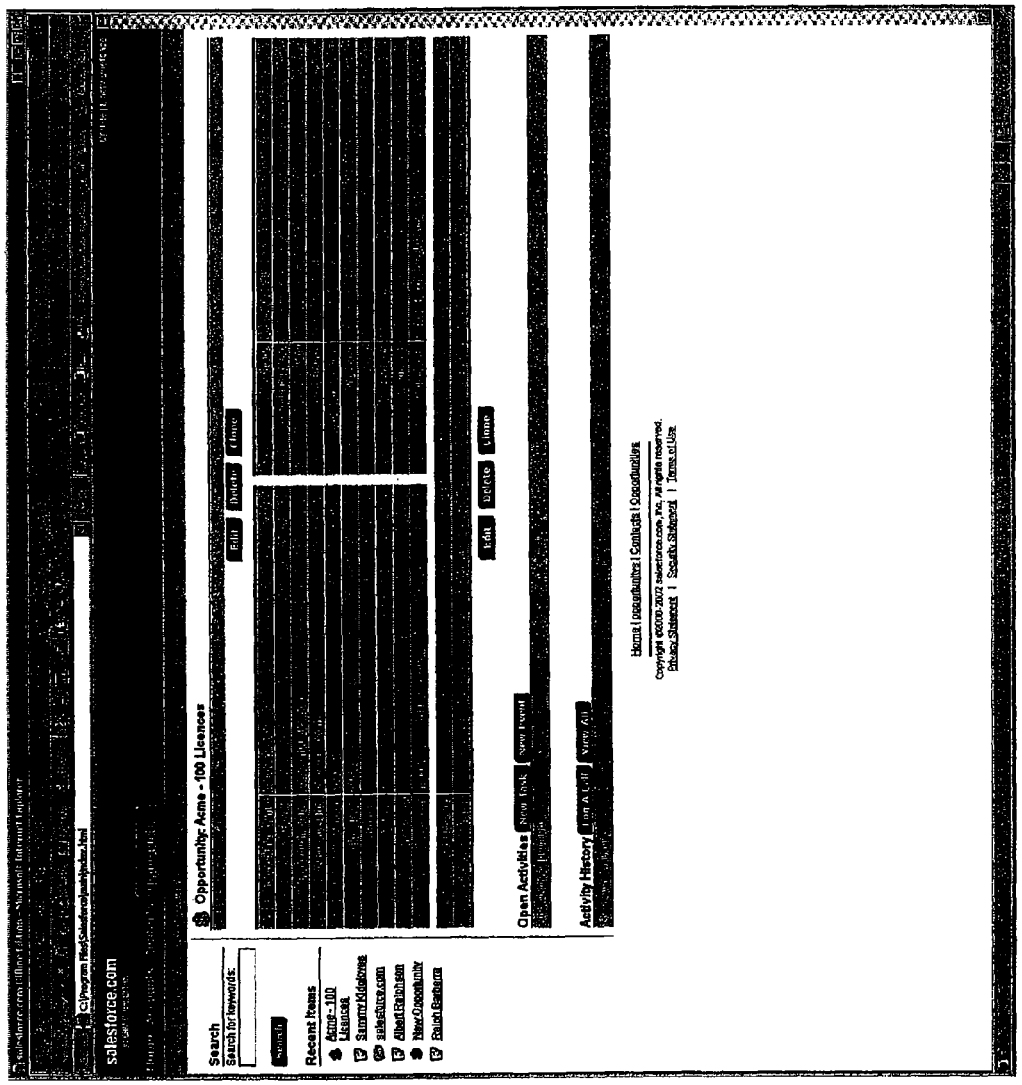
Figure 11D:
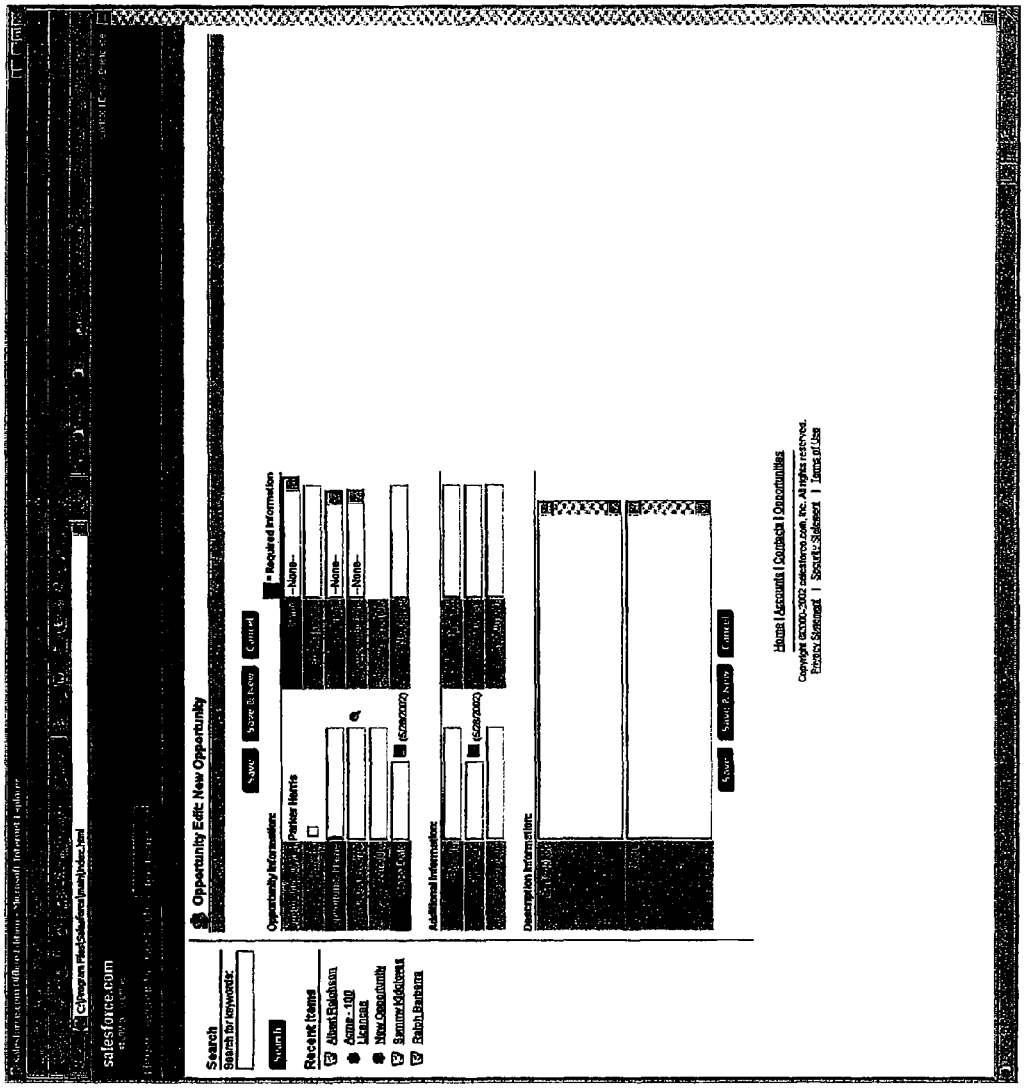

In one aspect, the endpoint, or listener module, includes an object that takes an XML SOAP message, and parses it to determine which API call is being made. One example of a process flow for parsing a SOAP request is shown in FIG. 16. FIG. 17 illustrates a process flow for the step of parsing a SOQL string in the process of FIG. 16.

In one aspect, the offline logic module includes logic to mirror one or more of the following APIs (and any other similar API calls or future API calls that may be added): Login, getUserInfo, GetServerTimeStamp, DescribeGlobal, DescribeSObject, DescribeLayout, Create, Update, Delete, Query, QueryMore, Retrieve, and Search.

API calls such as Login, getUserInfo, getServerTimeStamp, describeGlobal, describeSObject, and DescribeLayout are all reproducible offline using the system schema to return metadata. The system translates queries from the local database into SOAP messages that are returned to the listener module.

In one aspect, a Login call does not store the user password. Rather, it matches credentials with a hash of the password that was used for the last successful synchronization. The offline mirror of Create, in one aspect, returns a valid ID back to the client program, but there is no way for the ID to be the same ID the online version would return. IDs in the salesforce.com system, for example, are 15 characters, with the first three characters (key prefix) denoting the entity type, and the 4th character denotes which system the ID was created on. In one aspect, the offline logic module uses a unique character to identify IDs created online. In certain aspects, the offline logic uses the same ID prefix as the online application (e.g., the first three characters of the ID specify the table).

The offline mirror of Update, in one aspect, updates the requested records, and also updates a data field that is set by both online and offline APIs, e.g., a system_modstamp field. Thus when records need to be synchronized, the offline module, and/or the synchronization process, is able to determine which records need to be synchronized.

The offline mirror of Delete, in one aspect, not only marks the record in the local system for deletion, but it also cascade deletes any records parented to the record being deleted.

When the delete is performed, the offline API marks the requested record and its children for deletion, and at synchronization time, the requested records are deleted using the online API.

To Implement Query and QueryMore in the offline API, in one aspect, the system uses a grammar parsing and tokenizing tool, and then translates the SOQL query into a compatible SQL92 query to be run against the local relational database. An example of the process flow for a translation tool is shown in FIG. 17.

In one aspect, all requests for data are routed through the HandleRequest API of a handler class, e.g., CSOAP40RequestHandler class, which, based on the request type, creates an appropriate handler object responsible for processing the request. Each handler class is derived from CRequestBase and provides one virtual method named HandleRequest which is appropriately overridden based on the request type. For example, a CQueryHandler class, an example of which is shown in FIG. 16, is responsible for processing query type requests, and is a superset of various handler classes and provides SOQL to SQL92 translation facilities that are useful to query the local data store in it's native language.

Retrieve and Insert are each a subset of implementing Query offline.

SOAP responses generated by the request handlers are formulated by the CSOAP40ResponseWriter class (see, e.g., FIG. 18) which mimics those generated by the online API. FIG. 18 shows an example of a process flow for a WriteQuery Response according to one embodiment. For example, a response to a query request for Opportunity id and name might return the following:

```
|<?xml version="1.0" ?>
<soapenv:Envelope xmlns:soapenv="http://schemas.xmlsoap.org/soap/
envelope/" xmlns:xsd="http://www.w3.org/2001/XMLSchema"
xmlns:xsi="http://www.w3.org/2001/XMLSchema-instance">
   <soapenv:Body>
     <queryResponse xmlns="urn:enterprise.soap.sforce.com">
        <result>
          <records xsi:type="sf:Opportunity"
          xmlns:sf="urn:sobject.enterprise.soap.sforce.com">
             <sf:Id>006x00000001ondAAA</sf:Id>
             <sf:Name>Name </sf:Name>
          </records>
          <records xsi:type="sf:Opportunity"
          xmlns:sf="urn:sobject.enterprise.soap.sforce.com">
             <sf:Id>006x00000001onmAAA</sf:Id>
             <sf:Name>Name </sf:Name>
          </records>
        </result>
     </queryResponse>
   </soapenv:Body>
</soapenv:Envelope>
```

In certain aspects, calls that are typically used when organizations are performing database replication operations are not supported or simulated.

The various embodiments described in the above specification should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. For example and without limitation, those skilled in the art will recognize that there exist alternative proprietary technologies, languages and open standards (e.g., other than JavaScript, XML, XSLT, HTML, HTTP, etc.) that may be practiced in the context of the Internet and World Wide Web in accordance with the invention set forth herein. Furthermore, while much of the foregoing discussion has been described in the context of the World Wide Web and the Internet (e.g., local interface 210 is a web browser), those skilled in art will recognize that the invention disclosed herein may be implemented in other network environments as well. Similarly, while much of the foregoing discussion utilized the CRM area as an example, those skilled in the art will also recognize that other fields and areas may exploit the invention disclosed herein. Therefore, it is intended that the present invention be defined by the claims that follow.

What is claimed is:

1. A method of simulating, at a client device, an API for an online session between a remote server and the client when the client is offline, wherein the remote server includes data and functional logic that manipulates the data in response to API calls received from the client device, the method comprising:

downloading at least a portion of the data to a local database, and at least a subset of the functional logic, including one or more APIs and a listener module, when an active network connection between the client device and the remote server is established (online session), wherein the downloaded one or more APIs simulate the same functionalities provided by one or more remote server APIs resident on the remote server;

executing, at the client, a portion of the downloaded functional logic to generate a message including an API call to the one or more remote server APIs to access or manipulate data at the remote server; and if the client is actively connected with the remote server over the network, sending the message to the remote server; and if not, using the listener module, processing the message locally by accessing the data in the local database identified by the API call to the one or more remote server APIs and responding to the API call based at least in part upon the downloaded one or more APIs.

2. The method of claim 1, wherein the API call includes a request selected from the group consisting of a login request, a create record request, an update record request, a query request, a delete request, and a retrieve metadata request.

3. The method of claim 1, wherein the listener module includes a parser module, and wherein receiving the API call at the listener module includes parsing the message to determine a request in the API call.

4. The method of claim 3, wherein the API call includes one of a query request or a querymore request and wherein the listener module includes a translation module configured to translate the request in the API call to a query compatible with the local database.

5. The method of claim 4, wherein the request in the API call includes a SOQL query, and wherein the translation module translates the request to a SQL92 query.

6. The method of claim 1, wherein the message is an XML SOAP (Simple Object Access Protocol) message.

7. The method of claim 1, wherein the downloaded one or more APIs include web services APIs.

8. The method of claim 7, wherein the web services APIs include XML APIs, and SOAP APIs.

9. The method of claim 1, further comprising synchronizing with the remote server when an online connection is established between the remote server and the client device after a message is processed locally at the client device.

10. The method of claim 1, wherein the listener module includes a COM (Component Object Model) object that wraps the API call.

11. The method of claim 1, wherein the listener responds to the API call with a message that the API call has been processed successfully or unsuccessfully, such that the executed functional logic that generated the API call registers that the remote server has processed the API call.

12. A non-transitory computer readable medium, containing code executable by a processor in a client device to simulate an API for an online session between a remote server and the client when the client is offline, wherein the remote server includes data and functional logic that manipulates the data in response to API calls received from the client device, the code including instructions to:
  download at least a portion of the data from the remote server to a local database, and at least a subset of the functional logic, including one or more APIs and a listener module, when an active network connection between the client device and the remote server is established (online session), wherein the downloaded one or more APIs simulate the same functionalities provided by one or more remote server APIs resident on the remote server;
  execute, at the client, a portion of the downloaded functional logic to generate a message including an API call to the one or more remote server APIs to access or manipulate data at the remote server;
  if the client is actively connected with the remote server over the network, send the message to the remote server; and
  if not, using the listener module, process the message locally by accessing the data in the local database identified by the API call to the one or more remote server APIs and responding to the API call based at least in part upon the downloaded one or more APIs.

13. The computer-readable medium of claim 12, wherein the API call includes a request selected from the group consisting of a login request, a create record request, an update record request, a query request, a delete request, and a retrieve metadata request.

14. The computer-readable medium of claim 12, wherein the code further includes instructions to parse the message to determine a request in the API call.

15. The computer-readable medium of claim 14, wherein the API call includes one of a query request or a querymore request and wherein the code further includes instructions to translate the request in the API call to a query compatible with the local database.

16. The computer-readable medium of claim 15, wherein the request in the API call includes a SOQL query, and wherein the request is translated to a SQL92 query.

17. The computer-readable medium of claim 12, wherein the message is an XML SOAP (Simple Object Access Protocol) message.

18. The computer-readable medium of claim 12, wherein the downloaded one or more APIs include web services APIs.

19. The computer-readable medium of claim 18, wherein the web services APIs include XML APIs, and SOAP APIs.

20. The computer-readable medium of claim 12, wherein the code further includes instructions to synchronize with the remote server when an online connection is established between the remote server and the client device after a message is processed locally at the client device.

21. The computer-readable medium of claim 12, wherein the listener module is a COM (Component Object Model) object that wraps the API call.

22. The computer-readable medium of claim 12, wherein the code further includes instructions to respond to the API call with a message that the API call has been processed successfully or unsuccessfully, such that the executed functional logic that generated the API call registers that the remote server has processed the API call.

23. A computer system, comprising:
  a remote server storing data and functional logic that manipulates the data in response to ASPI calls received from one or more client devices;
  a network interconnect; and
  a client device, having a processor and a local database, wherein the processor executes logic that is operable to:
  download at least a portion of the data from the remote server to a local database, and at least a subset of the functional logic, including one or more APIs and a listener module, when an active network connection between the client device and the remote server is established (online session over the network interconnect, wherein the downloaded one or more APIs simulate the same functionalities provided by one or more remote server APIs resident on the remote server;
  execute a portion of the downloaded functional logic to generate a message including an API call to the one or more remote server APIs to access or manipulate data at the remote server; and
  if the client is actively connected with the remote server over the network, send the message to the remote server; and
  if not, using the listener module, process the message locally by accessing the data in the local database identified by the API call to the one or more remote server APIs and responding to the API call based at least in part upon the downloaded one or more APIs.

24. The system of claim 23, wherein the network interconnect includes the Internet.

25. The system of claim 23, wherein the API call includes a request selected from the group consisting of a login request, a create record request, an update record request, a query request, a delete request, and a retrieve metadata request.

26. The system of claim 23, wherein the logic executed by the processor is further operable to parse the message to determine a request in the API call.

27. The system of claim 26, wherein the API call includes one of a query request or a querymore request and wherein the code further includes instructions to translate the request in the API call to a query compatible with the local database.

28. The system of claim 27, wherein the request in the API call includes a SOQL query, and wherein the request is translated to a SQL92 query.

29. The system of claim 23, wherein the message is an XML SOAP (Simple Object Access Protocol) message.

30. The system of claim 23, wherein the downloaded one or more APIs include web services APIs.

31. The system of claim 30, wherein the web services APIs include XML APIs, and SOAP APIs.

32. The system of claim 23, wherein the logic executed by the processor is further operable to synchronize with the remote server when an online connection is established between the remote server and the client device after a message is processed locally at the client device.

33. The system of claim 23, wherein the listener module includes a COM (Component Object Model) object that wraps the API call.

34. The system of claim 23, wherein the logic executed by the processor is further operable to respond to the API call with a message that the API call has been processed successfully or unsuccessfully, such that the executed functional logic that generated the API call registers that the remote server has processed the API call.

35. A method for simulating an online session with a server at an offline client, comprising:
   downloading at least a portion of data stored at the server and at least a subset of functional logic of the server, including at least one API, to a database local to the client when and active network connection exists between the client and the server, wherein the at least one downloaded API simulates the same functionalities provided by an at least one server API resident on the server;
   receiving a request to access data at the server using an at least one server API invocation; and
   sending a message to the server to access data responsive to the request when the client is actively connected with the remote server and processing the message locally at the client by accessing data in the local database identified by the at least one server API invocation when the client is not actively connected with the server based at least in part upon the at least one downloaded API.

36. A non-transitory computer readable medium, containing code executable by a processor in a client device to simulate an online session with a server at an offline client, the code including instructions to:
   download at least a portion of data stored at the server and at least a subset of functional logic of the server, including at least one API, to a database local the client when an active network connection exists between the client and the server, wherein the at least one downloaded API simulates the same functionalities provided by an at least one server API resident on the server;
   receive a request to access data at the server using an at least one server API invocation; and;
   send a message to the server to access data responsive to the request when the client is actively connected with the remote server and processing the message locally at the client by accessing data in the local database identified by the at least one server API invocation when the client is not actively connected with the server based at least in part upon the at least one downloaded API.

* * * * *